SELECTION SYSTEM FOR ELECTRICAL CIRCUITS OR EQUIPMENTS

Filed June 14, 1950 8 Sheets-Sheet 1

Inventors
MARTINUS DEN HERTOG
CONSTANTINUS DE ZEEUW
By Robert Harding Jr.
Attorney SELECTION SYSTEM FOR ELECTRICAL CIRCUITS OR EQUIPMENTS
Filed June 14, 1950 8 Sheets-Sheet 2
FIG. 1. a
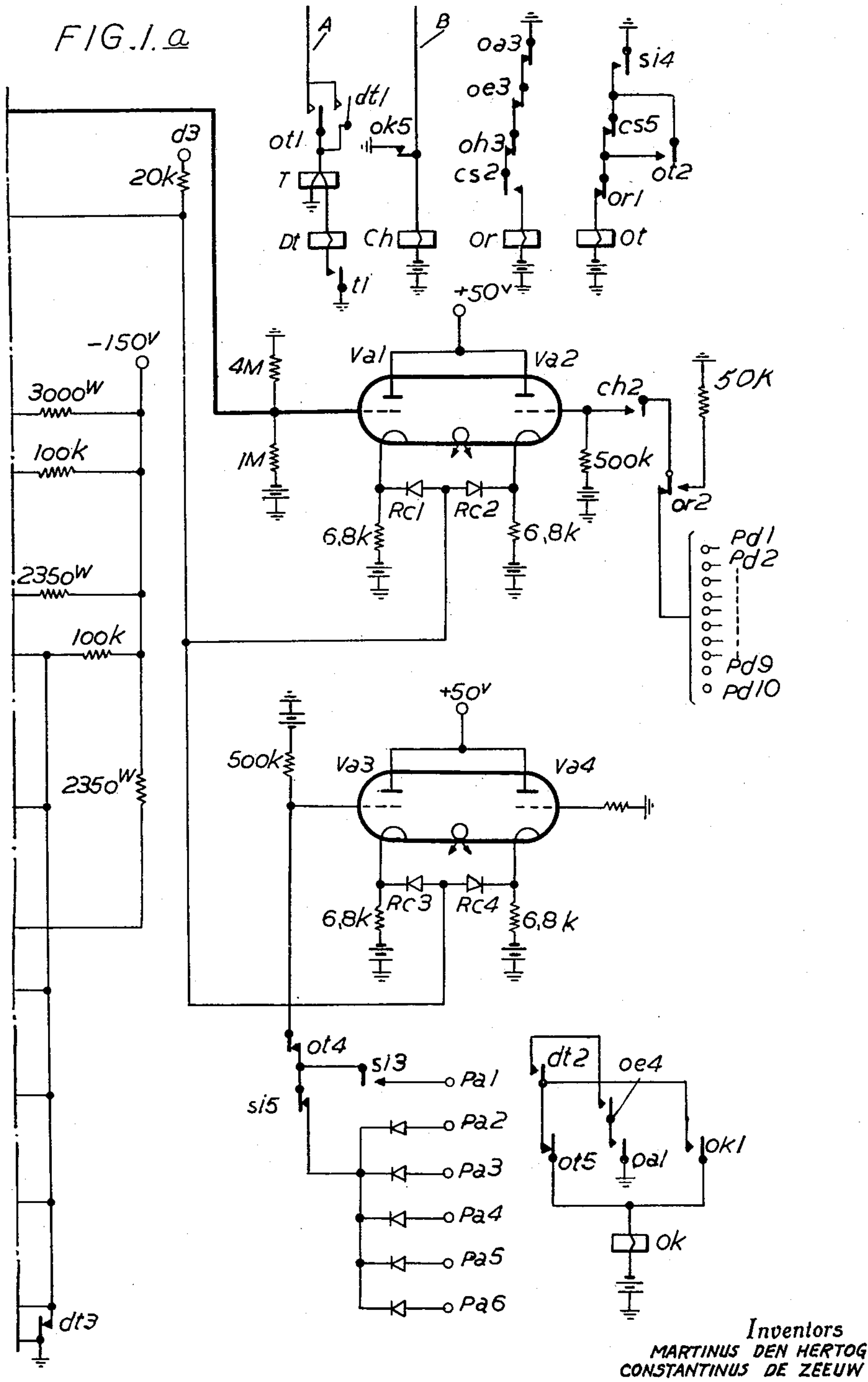
Inventors
MARTINUS DEN HERTOG
CONSTANTINUS DE ZEEUW
By Robert Harding Jr.
Attorney May 1, 1956 M. DEN HERTOG ET AL 2,744,162

SELECTION SYSTEM FOR ELECTRICAL CIRCUITS OR EQUIPMENTS

Filed June 14, 1950 8 Sheets-Sheet 3

Inventors
MARTINUS DEN HERTOG
CONSTANTINUS DE ZEEUW
By Robert Harding Jr.
Attorney May 1, 1956 M. DEN HERTOG ET AL 2,744,162

SELECTION SYSTEM FOR ELECTRICAL CIRCUITS OR EQUIPMENTS

Filed June 14, 1950 8 Sheets-Sheet 4

Inventors
MARTINUS DEN HERTOG
CONSTANTINUS DE ZEEUW

By Robert Harding Jr.
Attorney

SELECTION SYSTEM FOR ELECTRICAL CIRCUITS OR EQUIPMENTS

Filed June 14, 1950 8 Sheets-Sheet 5

Inventors
MARTINUS DEN HERTOG
CONSTANTINUS DE ZEEUW
By Robert Harding Jr.
Attorney

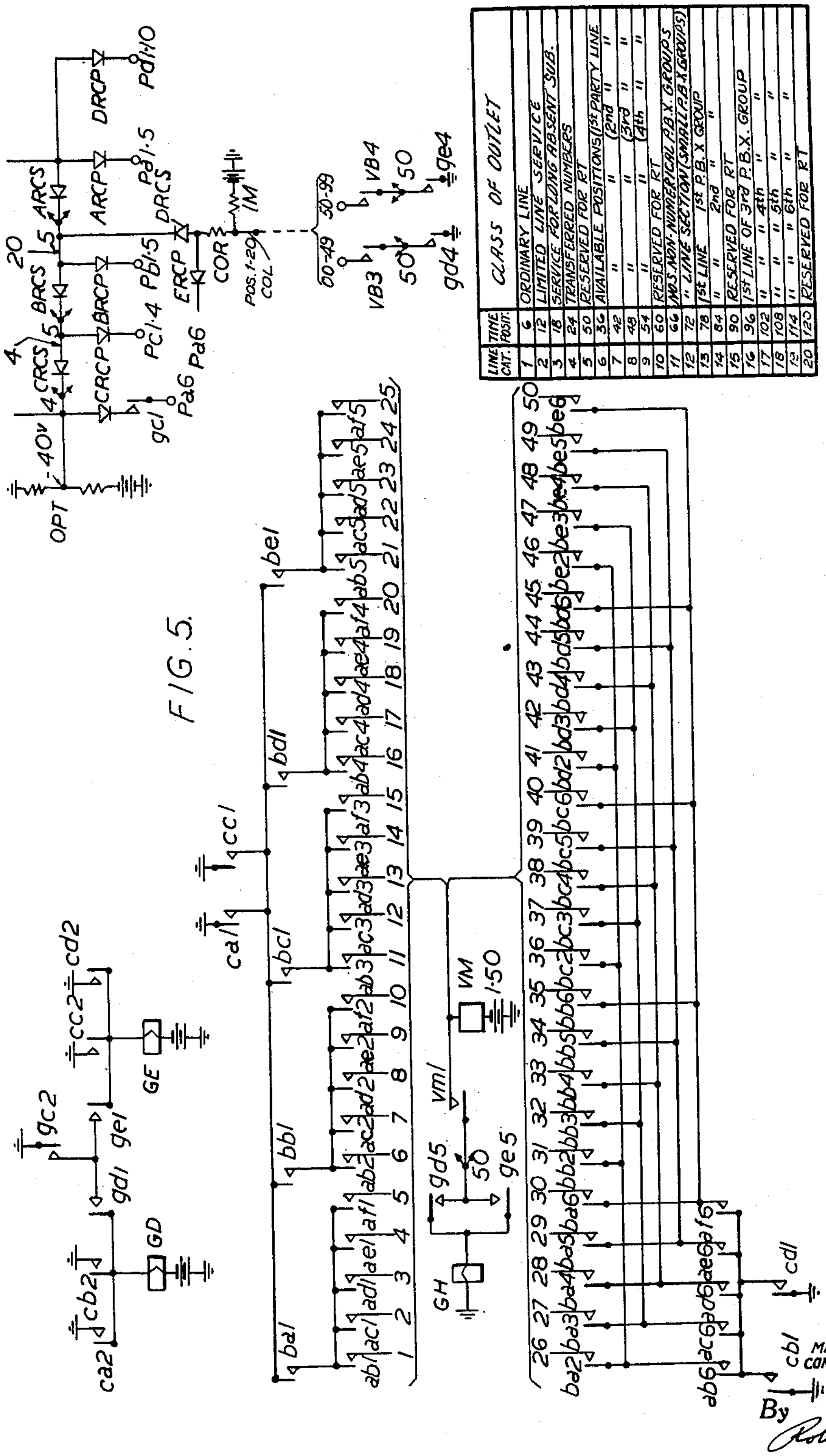

FIG. 5

| LINE CAT. | TIME POSIT. | CLASS OF OUTLET |
|---|---|---|
| 1 | 6 | ORDINARY LINE |
| 2 | 12 | LIMITED LINE SERVICE |
| 3 | 18 | SERVICE FOR LONG ABSENT SUB. |
| 4 | 24 | TRANSFERRED NUMBERS |
| 5 | 50 | RESERVED FOR RT |
| 6 | 36 | AVAILABLE POSITIONS (1st PARTY LINE |
| 7 | 42 | " " (2nd " " |
| 8 | 48 | " " (3rd " " |
| 9 | 54 | " " (4th " " |
| 10 | 60 | RESERVED FOR RT |
| 11 | 66 | NOS. NON-NUMERICAL P.B.X. GROUPS |
| 12 | 72 | " LINE SECTION (SMALL P.B.X GROUPS) |
| 13 | 78 | 1st LINE 1st P.B.X GROUP |
| 14 | 84 | " " 2nd " " |
| 15 | 90 | RESERVED FOR RT |
| 16 | 96 | 1st LINE OF 3rd P.B.X. GROUP |
| 17 | 102 | " " " 4th " " |
| 18 | 108 | " " " 5th " " |
| 19 | 114 | " " " 6th " " |
| 20 | 120 | RESERVED FOR RT |

Inventors
MARTINUS DEN HERTOG
CONSTANTINUS DE ZEEUW
By Robert Harding Jr.
Attorney

SELECTION SYSTEM FOR ELECTRICAL CIRCUITS OR EQUIPMENTS

Filed June 14, 1950 8 Sheets-Sheet 7

Inventors
MARTINUS DEN HERTOG
CONSTANTINUS DE ZEEUW
By Robert Harding Jr.
Attorney May 1, 1956 M. DEN HERTOG ET AL 2,744,162
SELECTION SYSTEM FOR ELECTRICAL CIRCUITS OR EQUIPMENTS
Filed June 14, 1950 8 Sheets-Sheet 8
FIG. 8.
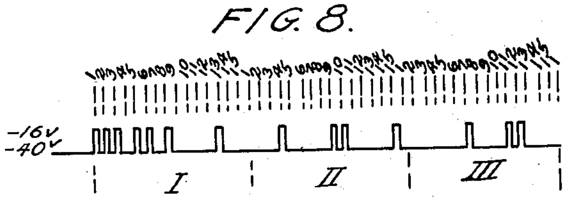
FIG. 7.
| COMB | $P_a$ | $P_b$ | $P_c$ | | COMB | $P_a$ | $P_b$ | $P_c$ | | COMB | $P_a$ | $P_b$ | $P_c$ | | COMB | $P_a$ | $P_b$ | $P_c$ | |
|---|---|---|---|---|---|---|---|---|---|---|---|---|---|---|---|---|---|---|---|
| 00 | 1 | 1 | 1 | 1 | 25 | 1 | 1 | 2 | 31 | 50 | 1 | 1 | 3 | 61 | 75 | 1 | 1 | 4 | 91 |
| 01 | 2 | 1 | 1 | 2 | 26 | 2 | 1 | 2 | 32 | 51 | 2 | 1 | 3 | 62 | 76 | 2 | 1 | 4 | 92 |
| 02 | 3 | 1 | 1 | 3 | 27 | 3 | 1 | 2 | 33 | 52 | 3 | 1 | 3 | 63 | 77 | 3 | 1 | 4 | 93 |
| 03 | 4 | 1 | 1 | 4 | 28 | 4 | 1 | 2 | 34 | 53 | 4 | 1 | 3 | 64 | 78 | 4 | 1 | 4 | 94 |
| 04 | 5 | 1 | 1 | 5 | 29 | 5 | 1 | 2 | 35 | 54 | 5 | 1 | 3 | 65 | 79 | 5 | 1 | 4 | 95 |
| 05 | 1 | 2 | 1 | 7 | 30 | 1 | 2 | 2 | 37 | 55 | 1 | 2 | 3 | 67 | 80 | 1 | 2 | 4 | 97 |
| 06 | 2 | 2 | 1 | 8 | 31 | 2 | 2 | 2 | 38 | 56 | 2 | 2 | 3 | 68 | 81 | 2 | 2 | 4 | 98 |
| 07 | 3 | 2 | 1 | 9 | 32 | 3 | 2 | 2 | 39 | 57 | 3 | 2 | 3 | 69 | 82 | 3 | 2 | 4 | 99 |
| 08 | 4 | 2 | 1 | 10 | 33 | 4 | 2 | 2 | 40 | 58 | 4 | 2 | 3 | 70 | 83 | 4 | 2 | 4 | 100 |
| 09 | 5 | 2 | 1 | 11 | 34 | 5 | 2 | 2 | 41 | 59 | 5 | 2 | 3 | 71 | 84 | 5 | 2 | 4 | 101 |
| 10 | 1 | 3 | 1 | 13 | 35 | 1 | 3 | 2 | 43 | 60 | 1 | 3 | 3 | 73 | 85 | 1 | 3 | 4 | 103 |
| 11 | 2 | 3 | 1 | 14 | 36 | 2 | 3 | 2 | 44 | 61 | 2 | 3 | 3 | 74 | 86 | 2 | 3 | 4 | 104 |
| 12 | 3 | 3 | 1 | 15 | 37 | 3 | 3 | 2 | 45 | 62 | 3 | 3 | 3 | 75 | 87 | 3 | 3 | 4 | 105 |
| 13 | 4 | 3 | 1 | 16 | 38 | 4 | 3 | 2 | 46 | 63 | 4 | 3 | 3 | 76 | 88 | 4 | 3 | 4 | 106 |
| 14 | 5 | 3 | 1 | 17 | 39 | 5 | 3 | 2 | 47 | 64 | 5 | 3 | 3 | 77 | 89 | 5 | 3 | 4 | 107 |
| 15 | 1 | 4 | 1 | 19 | 40 | 1 | 4 | 2 | 49 | 65 | 1 | 4 | 3 | 79 | 90 | 1 | 4 | 4 | 109 |
| 16 | 2 | 4 | 1 | 20 | 41 | 2 | 4 | 2 | 50 | 66 | 2 | 4 | 3 | 80 | 91 | 2 | 4 | 4 | 110 |
| 17 | 3 | 4 | 1 | 21 | 42 | 3 | 4 | 2 | 51 | 67 | 3 | 4 | 3 | 81 | 92 | 3 | 4 | 4 | 111 |
| 18 | 4 | 4 | 1 | 22 | 43 | 4 | 4 | 2 | 52 | 68 | 4 | 4 | 3 | 82 | 93 | 4 | 4 | 4 | 112 |
| 19 | 5 | 4 | 1 | 23 | 44 | 5 | 4 | 2 | 53 | 69 | 5 | 4 | 3 | 83 | 94 | 5 | 4 | 4 | 113 |
| 20 | 1 | 5 | 1 | 25 | 45 | 1 | 5 | 2 | 55 | 70 | 1 | 5 | 3 | 85 | 95 | 1 | 5 | 4 | 115 |
| 21 | 2 | 5 | 1 | 26 | 46 | 2 | 5 | 2 | 56 | 71 | 2 | 5 | 3 | 86 | 96 | 2 | 5 | 4 | 116 |
| 22 | 3 | 5 | 1 | 27 | 47 | 3 | 5 | 2 | 57 | 72 | 3 | 5 | 3 | 87 | 97 | 3 | 5 | 4 | 117 |
| 23 | 4 | 5 | 1 | 28 | 48 | 4 | 5 | 2 | 58 | 73 | 4 | 5 | 3 | 88 | 98 | 4 | 5 | 4 | 118 |
| 24 | 5 | 5 | 1 | 29 | 49 | 5 | 5 | 2 | 59 | 74 | 5 | 5 | 3 | 89 | 99 | 5 | 5 | 4 | 119 |
FIG. 9.
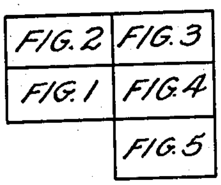
Inventors
MARTINUS DEN HERTOG
CONSTANTINUS DE ZEEUW
By Robert Harding Jr.
Attorney 2,744,162

SELECTION SYSTEM FOR ELECTRICAL CIRCUITS OR EQUIPMENTS

Martinus den Hertog and Constantinus de Zeeuw, Antwerp, Belgium, assignors to International Standard Electric Corporation, New York, N. Y., a corporation of Delaware Application June 14, 1950, Serial No. 168,072

Claims priority, application France June 24, 1949

24 Claims. (Cl. 179—18)

The present invention relates to a selection system for electrical circuits or equipments, particularly but not exclusively, for automatic telephone exchanges, which make it possible to select a free circuit or equipment in a particular group in an extremely short time.

One feature of the invention consists in a system of tests of electrical circuits comprising the use of different sources of test characteristics, the number of said characteristics being greater than the number of circuits to be tested, means being provided for associating several such test characteristics with a particular circuit and for making different tests on the circuit to check the identity of each of the test characteristics associated with said circuit.

Another feature of the invention consists in a system of tests of electrical circuits comprising the use of different sources of test characteristics, the number of which is greater than the number of circuits to be tested, said characteristics being distributed in different groups, means being provided to associate with each circuit several characteristics each coming from a different group, and for making several separate tests on the circuits in order separately to check the identity of each of the test characteristics associated with the circuits.

Another feature of the invention consists in a system of circuit tests according to the preceding feature in which the groups of test characteristics each have a factor common to all the characteristics of the group, no two groups ever having the same common factor.

Another feature of the invention consists in applying to each of the electric circuits a different test characteristic coming from a first group, said characteristics being at least equal in number to that of the circuits, and in applying to one or more of said circuits any one of the test characteristics from a second group of characteristics, arrangements being provided to make a first test among the test characteristics applied individually and to make a second test among the characteristics which can be applied in common to said circuits.

Another feature of the invention consists in a system of tests among a certain number of outgoing circuits, characterised by several series of sources of individual test characteristics, each of said series comprising a certain number of characteristics, at least equal in number to the number of circuits, and a different common factor for each series, and having a test characteristic individually assigned to each circuit, means being provided to associate each circuit with any one of the test characteristics individually assigned to said circuits, a certain number of additional sources of test characteristics being provided; arrangements being made for the temporary association of one or more of said outgoing circuits with each of said additional sources of test characteristics, and means being provided to test the individual test characteristics associated with circuits, and to test the additional test characteristics associated with said circuis.

Another feature of the invention consists in a system of tests of electric circuits which comprises several sources of impulses situated in time, forming cycles of different orders in which the length of an impulse of a cycle of the second order, interval between impulses being included if necessary, is equal to the length of a cycle of the first order, and so on, arrangements being made so that if the number of impulses be $x$ for a cycle of the first order, $y$ for a cycle of the second order and so on, the the cycles taken in combination produce a cycle of time impulses corresponding to a number $x \times y \times \ldots$ of time units of the first order which can be individually identified, the number of cycles of the various orders and the respective numbers of the impulses in each of the cycles of the different orders being such that $x \times y \times \ldots$ be at least equal to the total number of test characteristics necessary.

Another feature of the invention consists in a system of automatic telecommunication comprising a selector circuit with a multi-switch in which means are provided for applying to a common test circuit a different test characteristic coming from each of the different circuits of the multi-switch, said characteristic being sent on a return-signalling circuit, coming from the circuit of the switch, static distributors being provided for successively applying said different test characteristics to the test circuit or to said reurn signalling circuit.

Another feature of the invention consists in a system of automatic telecommunication comprising a selector circuit with multi-switch in which means are provided for successively applying to a common test circuit a series of signals which each characterise the identity and state of the corresponding outlet, arrangements being provided so that the nature of the signal identifiies the outlet and that the presence of the signal corresponding to an outlet indicates that said circuit is free (or busy).

Another feature of the invention consists in a system of automatic telecommunication comprising a selector circuit with multi-switch and a register controller in which the selector circuit comprises arrangements for applying to the common test device a certain number of characteristics each individually characterising an outlet, arrangements being provided for controlling the common test circuit by storage equipment in the register-controller arranged to store the identity of the desired line, a test characteristic having a particular factor determined by the register controller being thus detected, registering arrangements being actuated in accordance with the detected test characteristic, and arrangements being made to control the setting of the individual switch of the multi-switch under the control of registering devices in order to bring about the connection of the particular outgoing circuit corresponding to the detected test characteristic.

Another feature of the invention consists in an automatic telecommunication system comprising a selector circuit with multi-switch in which means are provided for temporarily associating any common test characteristic of a group of test characteristics to one or more circuits of a group of outlets, in addition to the test characteristics peculiar to said outlets, means also being provided to apply the common test characteristic of an outgoing circuit to a signalling circuit to the register-controller after the outgoing circuit has been selected in accordance with its individual test characteristic, and means in the register controller for identifying and registering said common test characteristic sent on the said signalling circuit.

Another feature of this invention consists in a system of automatic telecommunication in which the common test device is located in the register controller, the various test characteristics being composed of different time units following a certain cycle of units in which test impulses may occur, arrangements being provided so that, when a test characteristic is detected by the common test device, a signal is sent back to the selector circuit, the time unit corresponding to said signal controlling said registering devices for registering the identity of the selected outlet.

Another feature of the invention consists in the fact that the signal sent back to the selector circuit also actuates devices placed in the register-controller to modify the circuits of said register and to prepare them for the reception and detection of a common test characteristic.

Another feature of the invention consists of a system of automatic telecommunication comprising arrangements for replacing the time impulse control, determined by the identity of a desired line, by a time impulse control which selects the common test characteristics and eliminates the individual characteristics.

Another feature of the present invention consists of an automatic telecommunication system in which the time impulse control which is determined by the identity of a desired outlet is arranged to reject the common test characteristics and to make the selection from the individual test characteristics.

Another feature of the invention consists in an automatic telecommunication system which comprises means in the register controller for sending a further signal to the selector circuit after reception of a common test characteristic, arrangements being provided in the selector circuit to respond to said further signal and thus cause the connection of an individual switch of the multi-switch to the selected outlet.

Another feature of the present invention consists in an automatic telecommunication system in which means are provided in the circuit of the selector in order to actuate a vertical bar of the multi-switch corresponding to an outlet chosen in response to the operation of means for registering the identity of the outlet corresponding to an individual test characteristic which has been detected, means being provided in the register controller to send another signal to the circuit of the selector after the reception of the common test characteristic and means in the circuit of the selector to respond to said signal and, in response thereto, to cause the connection of an individual switch of the multi-switch to the chosen outlet.

Another feature of the invention consists in an automatic telecommunication system in which the devices of the selector circuit which respond to a particular signal cause the operation of an individual horizontal electromagnet of an individual switch and comprise means controlled by the individual horizontal electromagnet for sending a return signal to the register controller, devices being provided in the register controller in order to respond to the said signal and to cause transmission of another signal to the selector circuit in order to bring about the operation of a horizontal servo-electromagnet which actuates the selected horizontal bar by the individual horizontal electromagnet in order to complete the connection to the selected outlet.

Another feature of the present invention consists in a system of automatic telecommunication comprising individual circuits for each of the individual switches of a multi-switch and a common circuit for all the switches of the multi-switch, said common circuit comprising the device for transmission of the test characteristics, and means controlled by the horizontal bar of each of the individual switches, in order to disconnect from the common circuit the individual circuit corresponding to the switch of which the horizontal bar has been displaced.

Another feature of the invention consists in an automatic telecommunication system in which cycles of electrical time impulses of different orders are respectively employed for the purpose of effecting different discriminations, a first cycle of time impulses being used for the control of the selection and a second cycle of time impulses being used for signalling of information from a selector stage to a register controller.

Various other features will appear from the following description given as a non-limitative example, by referring to the attached drawings in which;

Figs. 1 and 1*a*, arranged side by side in the order mentioned show the circuit elements of a register controller sufficient to describe and explain the operation of the group selector and its common control circuit.

Fig. 4 and Fig. 5 show the common control switch for a multi-switch comprising several group selectors.

Fig. 7 shows a table indicating the method of employing the impulses of Fig. 6 to control the selection.

Fig. 8 shows a diagram of the potential obtained on the output of the scanning device in the case in which 15 outlets distributed in three groups are available.

Fig. 9 shows the method of connection of Figs. 1 to 5.

Figure 1:
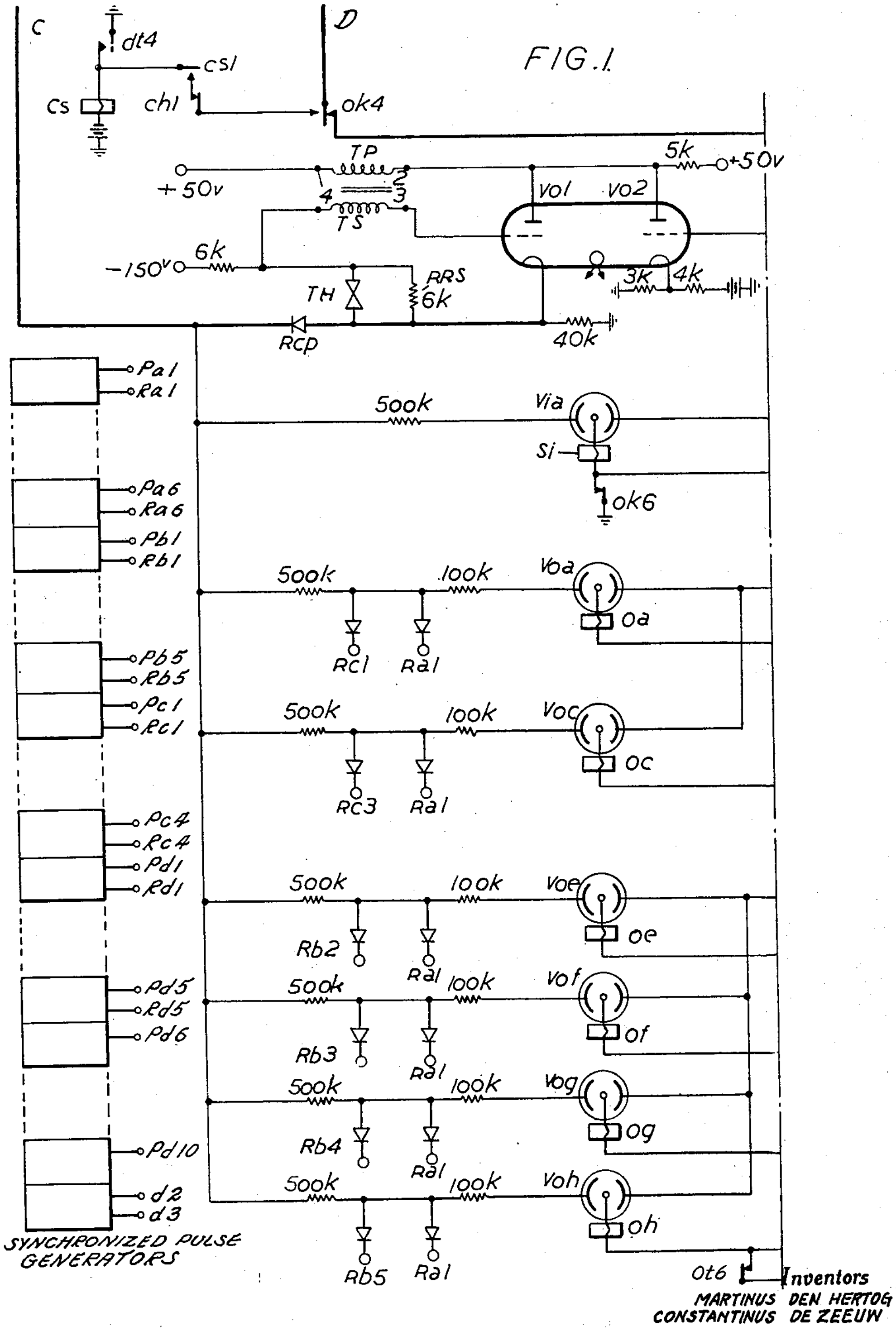

The object of a group selector circuit is to effect the selection of a free outlet in a group chosen from a plurality of groups under the control of a register in accordance with the corresponding digit of the desired subscriber's number.

This circuit is based on the use of a multi-switch which comprises a certain number of horizontal bars each of which may be considered as representing an individual switch capable of handling a call in a similar manner to that of a switch of a well-known single-motion type. By way of example, 100 outlets have been provided common to all individual switches and accessible to said switches. Vertical bars are also provided which cross all the horizontal bars and control the selection of a particular outlet, which has to be connected to an individual switch, by the action of the horizontal bar associated therewith. The operation of the multi-switch will be described later in a more detailed manner.

A multi-switch of this type is employed in the case of 100 outlets; a certain number of individual switches are provided, said number varying with the traffic requirements, each of them being adapted to be used independently to establish a connection to a free outlet.

Each of the switches has an individual selector circuit comprising a "horizontal electromagnet" HM, forming part of the multi-switch, and a relay GA.

A common control circuit has been provided for all the individual group selectors of a multi-switch. This circuit, by employing electronic means controlled by a certain number of periodic cycles of eelctrical impulses, and also under the control of a register, can carry out hunting and/or selecting operations for one of the individual selectors and control the operation of a vertical bar and a horizontal bar of the multi-switch in order to complete the connection employed by the call, when the outlet has been seized. The selection of a free outlet in a particular group is made under the control of the first digit of the desired subscriber's number. An available final selector is chosen from ten different groups of selectors, e. g. each of said selectors serving 100 lines. This selection is made under the control of the hundreds digit of the desired subscriber's number as it has been stored in the register which controls the selection.

In accordance with another method the selection may be made under the control of the register without direct relation to a particular digit, but as one of a variable number of selections determined by a combination of digits in accordance with a well-known method.

The hundred outlets may be distributed in all conceivable ways, in any number of groups, usually ten. This number is in no way limited.

The number of groups of outlets may be modified as desired; the number of outlets assigned to each group may be modified as desired, according to the traffic requirements, and the outlets of each of the groups may be taken haphazard from one of the hundred outlets available.

The equipment and the circuits of the common control switch are always the same and are not dependent on the way in which the outlets are distributed in the various groups.

In the common control switch of the group selector, arrangements have been provided so that an indication of class chosen among several indications, can be allocated to each of the outlets by means of a connection which can easily be displaced. The common control switch is provided to transmit this indication to the register handling the call.

The register controller comprises a device for registering digits of any known type; the circuits employed for connecting the register controller to the selector may also be carried out in accordance with a well-known process.

Consequently, it will be assumed that the digits making up the number of the desired line have been received and registered, and that the register controller has been connected to the first selection stage through the wires A, B, C, D. The earth applied through *ok*5 (Fig. 1) and the wire B cause the actuation of the relay GA (Fig. 3) in the first group selector through a back contact *hm*2 associated with the horizontal electromagnet HM; it also causes the operation of the relay C*h* (Fig. 1) in the register.

The relay GA, in operating, immediately causes the connection of the group selector circuit to the corresponding common control circuit, by respectively connecting the wires A, C and D to said common control circuit through the front contacts *ga*8, *ga*2 and *ga*6.

Figure 2:
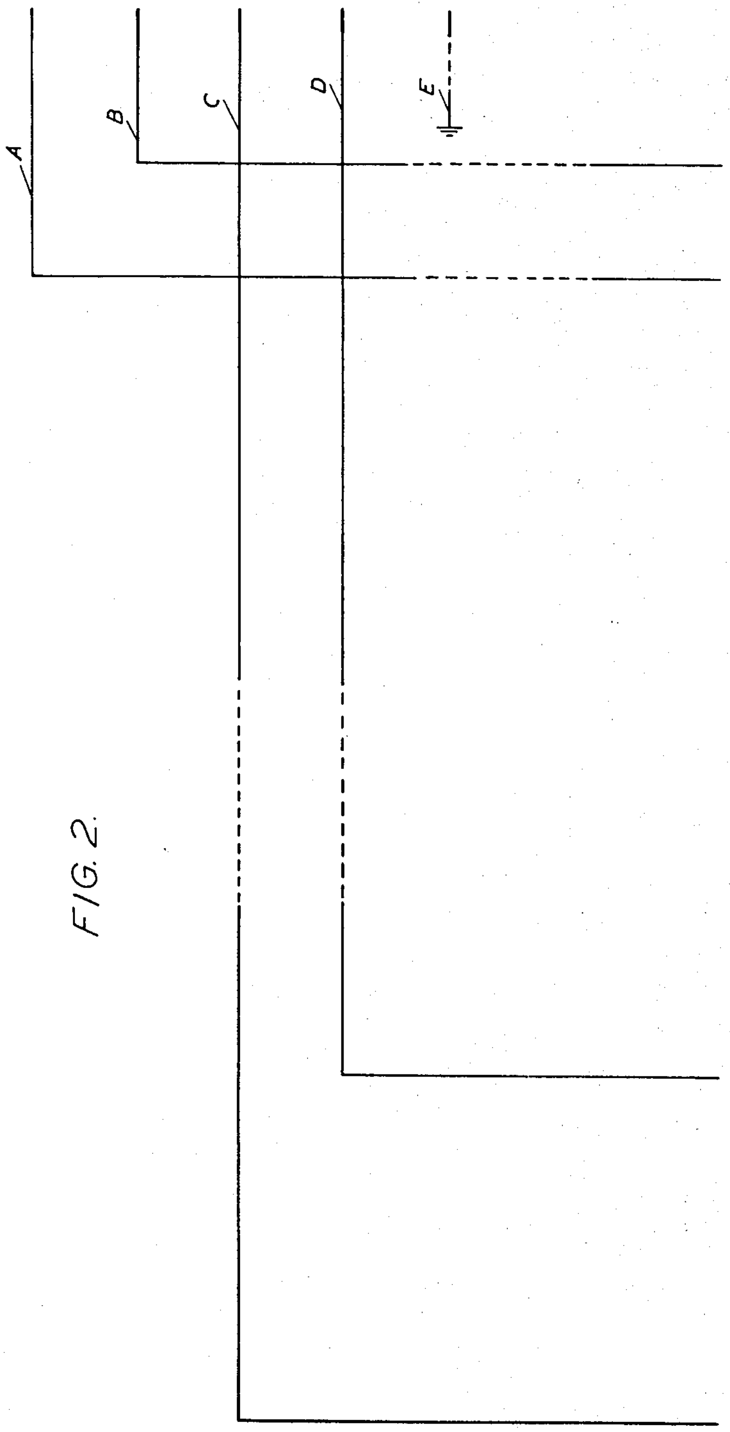
Fig. 2 shows the circuit between the register and one group selector stage.

Moreover, the relay GA prepares for itself a holding circuit through the wire E, in series with the winding of the horizontal electromagnet HM and the work contact *ga*4; the said electromagnet cannot operate at the moment under consideration owing to the fact that earth is directly connected to two ends of this winding, the wire E being in fact directly earthed as shown in Fig. 2.

The common control circuit is set in the operative position, earth being sent in said common control circuit through the following circuit: back contact HB1, associated with the horizontal bar, front contact *ga*1, back contact *gh*1, back contact *gc*3, relay GB, resistance and battery. The relay GB of the common control circuit operates, and through its contact *gb*1, applies earth to the anodes of the cold cathode tubes VRA, VRB, VRC, VD; through its contact *gb*3, it applies a potential of −150 v. to the cathode of the left hand portion SVA3 of the double triode SVA3/SVA4; it thus prepares the selection control circuit for the selection through the group selector of an outlet in the desired group.

Figure 3:
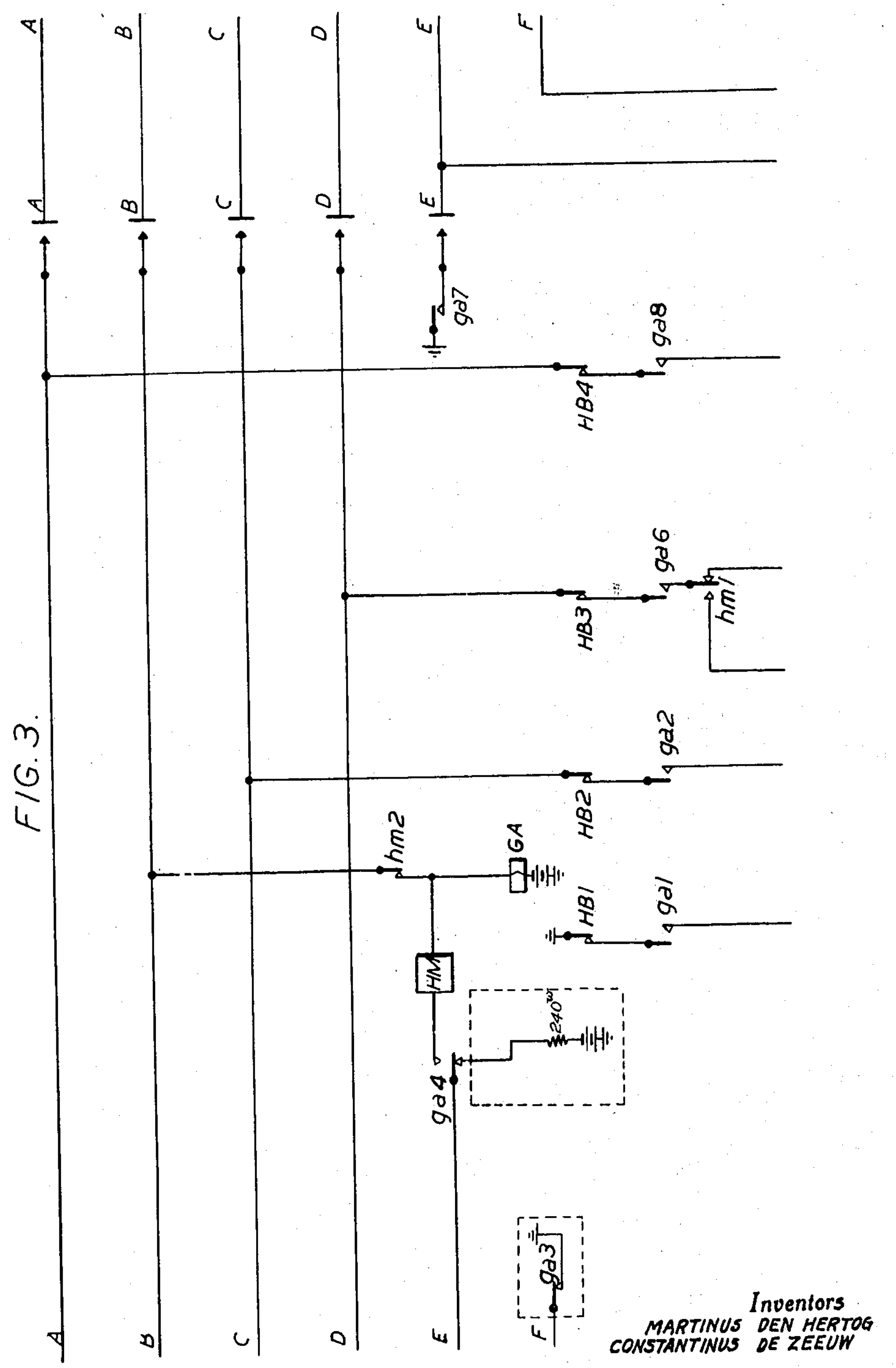
Fig. 3 shows individual circuit of an individual group selector in a multi-switch.
Figure 4:
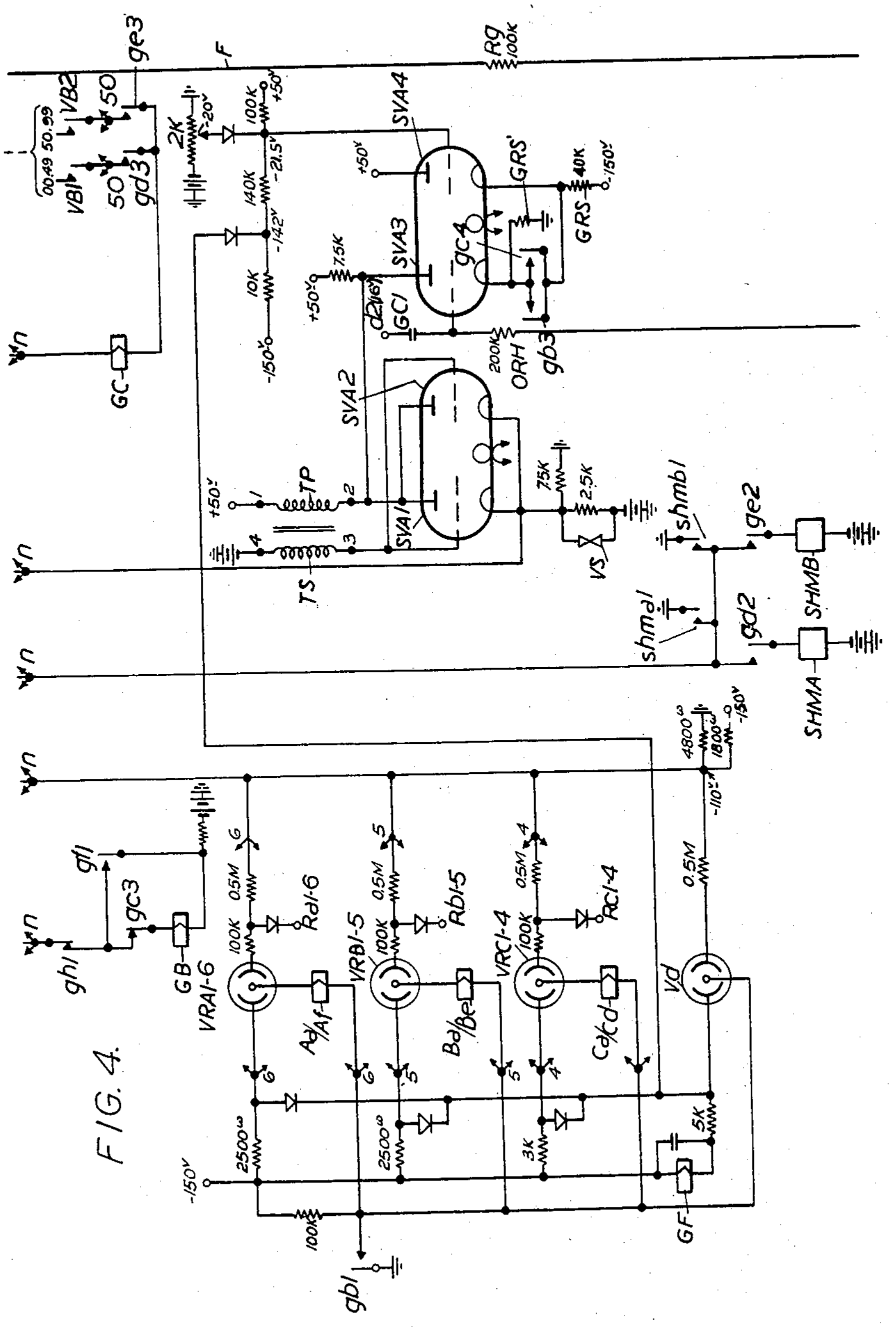

There are 100 outlets which can be reached through a group of selectors by means of 100 wires F, only one of which has been shown in Figures 3, 4 and 5. A resistance R*g* of 100,000 ohms has been provided in the common control circuit for each of the 100 outlets which can be reached through a group of selectors, this resistance being connected at one of its ends to the next selection stage through the wire F. If the outlet is free, the wire F is directly earthed, through a back contact *ga*3 of the relay GA of the next selector, as is shown in the left of the circuit of the first selector (Fig. 3) in order to facilitate the reading of the diagram.

When the resistance R*g* associated with an outlet is earthed, a current flow tends to be established from this earth toward a point of −40 v. potential, through three successive rectifier stages, placed in series ARCS, BRCS, CRCS and rectifiers placed in shunt ARCP . . . DRCP. The said potential of −40 v. is supplied by a potentiometer OPT placed in the common control circuit; this potential is moreover applied through a high resistance ORH to the grid of an amplifier tube SVA3 which forms one of the elements of a double triode SVA3, SVA4. The rectifiers placed in shunt, ARCP . . . DRCP are connected to sources of current which will be described in the following paragraph.

Figure 6:
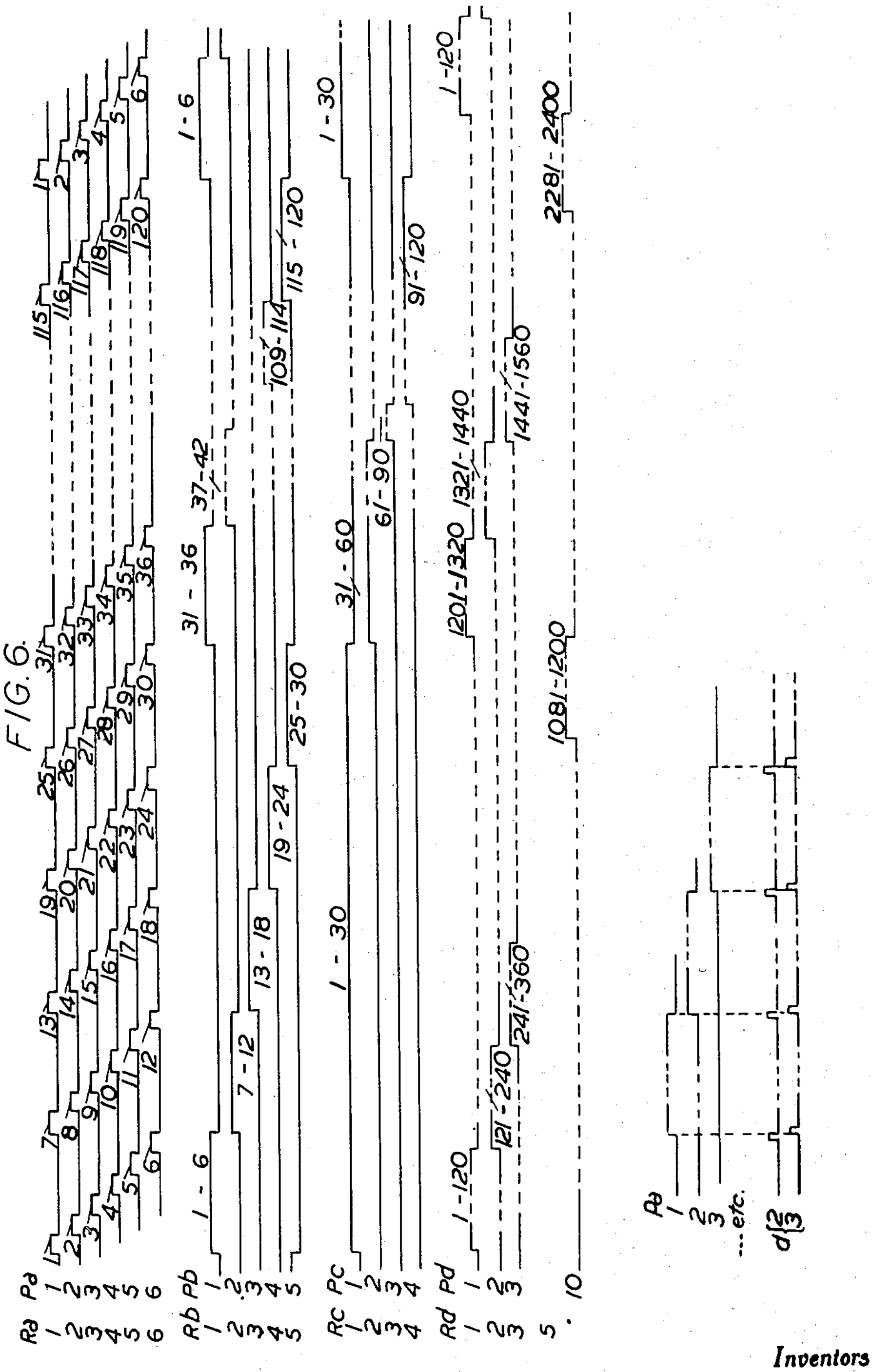
Fig. 6 shows a diagram of the time impulse cycles employed to control the selection.

Fig. 6 shows the curves of the impulses produced by the different sources which are shown at the left side of Fig. 1, said impulses being employed as time bases in order to obtain a 1200 element code.

Two principal groups of sources have been provided; the first are designated by the references P*a*, P*b* . . . and the others by R*a*, R*b* . . . . The principal difference between these two groups of sources consists in their difference of potential. The sources P are always provided for insertion in the grid circuit of an amplifier tube, and their potentials have been determined accordingly. The sources R are always provided for applicaation to the control electrodes of cold cathode tubes and their potentials have been adapted to the operative conditions of said tubes.

Each of the groups P*a* and R*a* comprises six sources supplying an impulse for six time units which succeed each other in accordance with a periodic cycle. The length of each of these impulses corresponds to the duration of the time unit on which the whole system is based, and will be taken in the following as the unit of time.

Each of the two groups P*b*, R*b* comprises five sources supplying an impulse for five time units which succeed each other in accordance with a periodic cycle. The length of each of the impulses corresponds to six time units and their period to thirty time units.

Each of the two groups P*c* and R*c* comprises four sources of time impulses, the length and period of which respectively correspond to 30 and 120 time units.

The groups P*d* comprise ten sources, of which the impulses correspond to 120 time units and the period to 1200 time units. These ten sources, like those of the other groups, produce time impulses displaced with respect to each other in such a way that the impulse produced by each of the sources comes after that of the preceding source.

The five sources R*d*, have been provided which are identical with sources P*d*1 . . . 5, with regard to the characteristics relating to time.

Fig. 6 also shows the relation existing between the source P*a* and two detector sources *d*2 and *d*3. The detector source *d*2 transmits an impulse which is located within the corresponding impulse P*a* even if said impulse is distorted. The detector source *d*3 which corresponds to *d*2 transmits an impulse at the beginning of the next transmission period of the basic source P*a*.

The sources of the three first types, that is, P*a*, P*b* and P*c* are employed to control the transmission of a signal constituted by a time impulse, as also the detection of a signal constituted in the same manner. The simultaneous use of any three sources of different types makes it possible to obtain $6\times5\times4=120$ time units. At the transmitting end these 120 time units are employed for scanning 100 outlets and twenty additional indications which may be temporarily associated with said circuits in any desired manner. In order to permit the scanning of the 100 outlets, said circuits have been distributed over the 120 time units so that the five first positions alone are employed in each of the successive groups of six positions 1 . . . 6, 7 . . . 12, . . . , for scanning the circuits, while the last position is not used for this function. In other words, the sources of periodic impulses, P*a*1 . . . 5 are employed for the scanning of the 100 periods while the source of periodic impulses P*a* 6 is not used for this purpose. Consequently, source P*a*6 will be successively used for scanning the twenty remaining conditions for the duration of the twenty impulses sent by said source in a period of 120 time units.

The characteristics of the outlets of which the register requires information are as follows:

(*a*) Characteristic of position in the bank of the multiswitch;

(*b*) Condition characteristic; line free or busy;

(*c*) Group characteristic; exchange, selector group, service to which the scanned line is directed;

(*d*) Class characteristic; nature of the number of the exchange or of the service connected to the scanned line.

The characteristics *a, b, c,* are simultaneously transmitted by the scanning device. The latter comprises three gating steps obtained by means of the 14 impulse generators P*a*1 to P*a*5, P*b*1 to P*b*5, P*c*1 to P*c*4. These 14 generators define the 100 position characteristics of the 100 lines scanned.

The condition characteristic *b* is given by the potential of the test wire which, when the line is free is the earth potential. The line is busy when the test wire is open or connected to the −48 v. battery.

The group characteristic *c* is added to the other characteristic by connecting in parallel to each wire F an impluse source P*d*1 to P*d*10 through the rectifier DRCP which characterizes the chosen group (case of ten outlets). This source is connected through the rectifier DRCP and a grouping distributor (not shown) which makes it possible to connect any source P*d* to any wire F, that is to say, to allocate any outlet to any group and to form groups of variable importance.

When a line is busy, the wire F is either open or brought to the potential of −48 v. Even if the sources P*a*, P*b*, P*c*, P*d*, connected to this line are all at the potential of −16 v., the wire F remains at the potential −40 v. and no impulse is sent to the group of SVA3.

On the other hand, when a line is free, the wire F, being brought to potential zero (earth potential), the output of the scanning device is brought to a potential substantially equal to −16 v. when the sources P*a*, P*b*, P*c*, P*d* are at the potential of −16 v. The input of the tube SVA3 is then unblocked and an impulse appears on the wire D.

In the absence of the source P*d*, impulses will arrive at the wire D for all the free scanned lines during each cycle of 120 impulses (it will be remembered that twenty impulses are reserved for the class indications). Owing to the presence of the source P*d*, these impulses are absorbed by this source in all the cycles of 120 impulses which do not correspond to the transmission of one impulse by said source P*d*, the potential of this source being −40 v. outside the time of the impulses.

Thus the impulses sent over the wire D only correspond to free lines and are grouped in time according to the distribution of these lines in the various groups of outlets.

The diagram of Figure 8 shows the voltages on the output of the amplifier tube SVA3 when it is assumed that 15 outlets are variably distributed in three groups. The lines 1, 2, 3, 5, 6, 8, and 13 are free lines belonging to Group I, the lines 4, 9, 10, and 15 are free lines of Group II, the lines 7, 11, and 12 are free lines of Group IV. Line 14, for example, is a busy line.

At the receiving end, the impulses are received after having been displaced by one time unit by reason of the successive use of the detector impulses *d*2, *d*3 for the transmission and reception of the impulses, an impulse transmitted in time unit No. 1, being received on time unit No. 2 etc. . . . Consequently, the impulses sent during the 5 first time units of each group of six will be received during the 5 last time units of each of said groups. The sources R*a*2 . . . 6 will then be employed when the impulses characterising the 100 periods and which are emitted by means of sources P*a*1 . . . 5 are received. The source of impulses R*a*1 is only used exclusively when the twenty special indications previously mentioned are received, transmitted by means of source P*a*6.

The sources P*d*1 . . . 10 are employed for associating a special group indication with each of the outlets; thus in the case of outlets of a group selector, these sources are employed to characterise the group of said outlets.

Fig. 7 represents the method of employing sending sources P*a* . . . P*c* in combination with three gates supplying impulses to the register controllers; Fig. 5 shows a gate composed of rectifiers which make it possible for 100 outlets to send an impulse to the grid circuit of an amplifier tube in 100 different time units, the said tube retransmitting these impulses to a register. Fig. 7 also shows the method of connecting sources P*a* . . . P*c* with three successive stages of gates such as ARCP, BRCP, CRCP shown on the common control circuit of the selector (Fig. 5). The table shows sources which must be used for the gates associated with each outlet. This table also shows in which time unit an impulse must be sent for each of the outlets.

The P sources are normally at a potential of −40 v., but, at different times this potential is brought for a short instant to −16 v. The current can only flow from earth on wire F to the potentiometer OPT and from that to the grid of tube SVA3, when this potential of −16 v. is present simultaneously on the three rectifiers ARCP, BRCP, CRCP . . . connected to the scanning circuit coming from the wire F of an outlet. When the potential of said sources, or one of them is −40 v., said potential is present in effect on the circuit which connects the resistance R*g* of the common control circuit of the group selector to the potentiometer OPT, since said potential can be transmitted through one of the branch rectifiers, for example ARCP, which then offers a low resistance; the difference of potential between the earth on wire F and the source connected to the branch rectifier (−40 v.) is absorbed in the resistance R*g* and no current passes to the potentiometer. The branch rectifiers thus act as gates which can open or close the circuit to the potentiometer OPT; only when this device is closed by the application of a potential of −16 v. by the associated sources can current flow to the potentiometer. The result of this is that only when all the gates controlling the circuit connecting the resistance R*g* of a particular outlet to the potentiometer OPT are closed, can current circulate from earth to the potentiometer. It is thus only at this moment that the potential of the potentiometer and consequenly of the grid of tube SVA3 will be brought to −16 v. by reason of the respective values of the various resistances in the circuit, provided that the outlet is free, that is to say provides an earth potential.

It will now be seen that the three sets of sources P*a*, P*b* and P*c* are connected to the gates in such a way that said systems pass the current at different time units for each of the 100 outlets; when a circuit is free it sends impulses to the grid circuit of the tube SVA3 for a time unit which characterises this outlet. The manner of connecting the various gates, which makes it possible to obtain this result for the various outlets numbers "00" to "99," is shown on the table in Fig. 7, which also shows the time units corresponding to the impulses transmitted by each of the outlets. It will be noted that this table refers to time units numbered in series from 1–120, arrangements being made so that the sixth unit of each group of six does not correspond to any transmission, 100 units out of 120 being employed for the 100 outlets. Each outlet of a group selector is connected in the common control circuit (Fig. 5) with an individual gate which itself is connected to one of the sources P*a*1 . . . 5. Each of the successive groups of five outlets corresponding to the time units 1 . . . 5, 7 . . . 11, and connected to the various sources P*a*, is associated with a second stage of gates constituted by the rectifiers BRCS, BRCP. Thus in all, there are $$\frac{100}{5}=20$$

gates in the second stage which are divided in turn into four groups of five. The gates of each of these groups are respectively connected to the five sources P*b*1 . . . 5. The gates corresponding to one of these groups are connected to a third stage of gates CRCS and CRCP common to said groups. Four gates CRCS and CRCP have thus been provided, each of which is connected to one of the sources P*c*1 . . . 4.

Each of the outlets connected to a gate associated with one of the sources P*a*1 . . . 5 is also connected to a second gate DRCP, which may be connected to one of the ten sources P*d*1 to P*d*10 by connections which can be displaced as desired.

This connection characterises the group to which the outlet belongs, a connection terminating in a source P*d*1, P*d*2 indicating that the outlet belongs to group No. 1, to group No. 2.

It is obvious that the group potential supplied by wire F will be absorbed in the resistance R*g* at any moment, the potential of the lower terminal of this resistance being maintained at any moment at −40 v., except when the source P*d* connected to the particular gate to the circuit concerned supplies a potential of −16 v., the potential of the lower terminal of resistance R*g* then being brought to this value of −16 v. In other words, the potential on the lower terminal of R*g*, for each of the outlets of group No. 1, may be brought to such a value that the grid of the amplifier tube is only influenced during the time unit when the source P*d* is sending an impulse, that is to say, during the time units 1–120. Similarly the outlets forming part of the second group can only influence the grid potential in the time units 121 . . . 240, etc.

The result of this is that for each outlet an impulse from the wire F can only be sent to the grid circuit in one of the 1200 time units, which characterises both the number of the outlet and the group to which said circuit belongs.

For example, the outlet No. 25, according to the table in Fig. 7, would send an impulse in time unit No. 31 under the control of sources P*a*, P*b* and P*c*. When this outlet is connected for example, to group No. 5, source P*d*5 at any moment will absorb the impulses transmitted by said circuit, except in the period corresponding to the fifth group of 120 time units, so that in these conditions an impulse is only sent in the 31st time unit of the fifth period, that is to say, in time unit No. 511 (that is, time unit No. 120×4+31).

The cathode circuit of amplifier tube SVA3 is normally connected to earth through a resistance GRS; under these conditions, the grid is sufficiently negative with respect to the cathode for the impulses transmitted to the grid circuit through the gates not to cause the operation of the tube. When the common control circuit is seized, the relay GB through its make contact *gb*3 applies a potential approximately equal to −20 v., owing to the fact that a circuit is completed from the cathode of the suppressor tube SVA4 to the cathode of SVA3, the tube SVA4 forming the right hand part of the double triode of which the amplifier tube SVA3 forms a part. The suppressor tube is mounted in such a way that its cathode is normally at a potential of −20 v., its grid being normally maintained at −21.5 v. Consequently, when the contact *gb*3 is closed, the cathode of the amplifier tube SVA3 is brought to −20 v. Under these conditions, the respective potentials of the cathode and the grid are such that the impulses transmitted by the gates alone do not influence the tube, but only have the object of charging the small condenser GC1 which connects the grid to an impulse source *d*2. The characteristics of source *d*2 are also indicated on Fig. 6. When this source sends a short positive impulse at the moment when the condenser is already charged by an impulse from the gates, the potential of the grid is momentarily brought to such a value that current flows in the anode circuit. A short impulse is transmitted to the anode circuit of the two triodes SVA1, SVA2 forming another double triode, and acts in such a way on these triodes, through a transformer connected to said double triode, that said triodes generate an impulse which is transmitted from their cathode circuit to the associated selector.

The beginning of this impulse coincides with that of impulse *d*2, as may be seen in Fig. 6, this coincidence occurring towards the end of the time unit allocated to the impulse produced by a particular outlet. The length of the impulse regenerated in this way approximately corresponds to half the length of a time unit, so that it is still being transmitted during a part of the next time unit.

The short impulse is transmitted to the anode of the regenerator tubes and causes current to flow in the primary winding of the transformer connected to said anodes. This has the effect that the potential induced in the secondary TS of the transformer, renders the potential of the grids of the regenerator tubes more positive. If the amplitude of the potential applied is sufficient to bring the potential of the grid to a suitable value, taking the bias into account, the generator is started. The anode current begins to flow through the winding TP of the transformer, the grids then becoming more positive, thus causing a fresh increase of the anode current. The potential of the grid is very rapidly brought to a value higher than that of the cathode; a stronger grid current begins to flow, thus limiting any subsequent increase of the grid potential. At this moment, anode and grid currents begin to decrease, the latter decreasing more rapidly than the former, so that the difference between the ampere turns of the anode and grid windings increases rapidly.

After a certain time, which depends to a great extent on the self-inductance of the windings of the transformer and of the anode resistance of the tubes, the grid current is cancelled. From now on any reduction in the anode current causes, by induction, the appearance of a negative potential in the grid winding, which in turn causes another reduction of the anode current. The tube is thus rapidly de-energised and remains idle until the arrival of a fresh trigger impulse.

In this way, the appearance of an impulse of nearly rectangular form is produced, the amplitude and duration of which depend neither on the amplitude nor the form of the trigger impulse.

It is clear that such an impulse is generated for each of the free circuits, and that all these impulses are transmitted to the register, through the group selector, through the following circuit: back contact *hm*1, make contact *ga*6, back contact HB3 and wire D.

The positive return impulses sent on the wire D are transmitted through the back contact *ok*4 to the grid of the thermionic tube V*a*1 (Fig. 1). The grid of V*a*1 is normally very negative, owing to the fact that the resistance inserted between earth and the grid is 4 megohms, while the resistance inserted between the 48 v. battery and grid is only of 1 megohm. Similarly, the grid of the tube V*a*2 (the other half of the twin triode V*a*1, V*a*2) is normally negative, a negative battery being connected permanently to said grid through a 500 k. resistance. The device which stores the first digit in the register transmits, impulses P*d* in the well known manner, in one of the ten time units of the cycle P*d* on the grid of the tube V*a*2, through back contact *or*2 and the make contact *ch*2. Each impulse received on the grid of V*a*1 renders the tube conductive, and the cathode which is normally negative becomes positive by reason of the high resistance of the cathode circuit with respect to that of the anode and cathode path. Each time an impulse P*d* is applied to the grid of V*a*2, the tube becomes conductive and its cathode is brought to a positive potential.

Two other twin triodes V*a*3, V*a*4, have their cathodes mounted in the same manner as those of V*a*1, V*a*2 through rectifiers R*c*3, R*c*4; the said cathodes are connected in parallel with the common wire which terminates on the cathodes of V*a*1, V*a*2, to the grid of tube V*o*2.

An earth potential is applied permanently to the grid of tube V*a*4, so that said tube V*a*4 is always conductive. If necessary, the grid of tube V*a*4 could be connected via a change over contact to another group of pulse sources, in the manner shown in tubes Va2 and Va3.

The grid of tube Va3 is connected to the sources Pa2 . . . 6 through the back contact ot4, back contact si5, and the rectifiers respectively connected to said sources. During each of the impulses Pa2 . . . 6 current flows from the negative battery of the exchange to the point of potential —16 v. supplied by said source, through the grid resistance of Va3 and the corresponding rectifier to the source concerned; the grid will be brought to the potential of —16 v. during the period of the impulses Pa2 . . . 6, the tube Va3 then being conductive. However, during the period between two of the impulses supplied by the source Pa1, a potential of —40 v. will be applied to the grid of Va3, and said tube will not be conductive. A negative potential thus prevails on the cathode of Va3 during the period between the impulses Pa1, the impulse generator not being actuated by the impulses coming from a common control circuit through the wire D, during the period of the impulses Pa1.

Impulses coming from source d3 are continuously applied to the grid of the tube Vo2, which forms part of a double triode Vo1, Vo2 adapted to produce impulses. When one or more of the cathodes Va1, Va2, Va3, Va4, are negative, each of the impulses d3 is absorbed in a 20 k. resistance, by reason of the flow of current which is produced through said 20 k. resistance, the rectifiers Rc1, Rc2, Rc3 or Rc4 and the negative cathode or cathodes of the tubes. When impulses are simultaneously applied to the grids of the tubes Va1, Va2, Va3, by the group selector, by the source Pd corresponding to the registered digit, and by the sources Pa2 . . . 6, all the cathodes are simultaneously positive; the corresponding impulse d3 renders the grid of Vo2 positive, since there is no current flowing through the 20 k. resistance and one of the rectifiers.

Consequently, the tube Vo2 causes the operation of tube Vo1. Tube Vo1 forms a part of an impulse regenerator which also comprises a transformer Tp, Ts, connecting the anode and grid circuits, a resistance RRS, and a varistor or thermistor TH in parallel on the grid and cathode polarisation circuits.

In the absence of a trigger impulse, the grid of the generator tube Vo1 is polarised at a value which does not permit the tube to operate, and no current flows either in the windings of transformer TP, TS, or in the tube. If a negative potential is suddenly applied to the anode of the tube, this potential changes sign after having been transmitted to the grid winding of the coupling transformer, said grid then becoming positive. If the amplitude of the potential applied is sufficient to bring the potential of the grid to a suitable value taking into consideration the grid bias, the generator is triggered off. The anode current begins to flow through the anode winding; the grid then becomes more positive and in turn produces an increase in the anode current. Almost immediately, the grid becomes more positive than the cathode; a considerable grid current begins to circulate, thus restricting any subsequent rise in the grid potential. At this moment, the anode current and the grid current begin to decrease, the latter decreasing more rapidly, so that the difference between the ampere turns of the anode windings and grid windings rapidly increases.

After a time which will depend to a great extent on the self-inductance of the windings of the transformer, and on the resistance of the anode circuit of the tube, the grid current is cancelled. From this moment, any decrease of the anode current causes the appearance of a negative potential in the grid winding, which in turn causes another decrease of the anode current. The tube is then rapidly shut off, the remains inoperative until a fresh trigger impulse arrives.

An impulse of substantially rectangular form is thus produced in the cathode circuit, of which the amplitude and duration are not dependent either on the amplitude or form of the trigger impulse.

The loading resistance RRS, placed in the cathode circuit of the generator, makes it possible to transform the current impulse into a voltage impulse, said voltage being maintained at substantially the same value for the whole duration of the impulse.

One impulse will be generated for each trigger impulse applied to the anode, after which the tube returns to normal. The voltage impulse produced on the terminals of the cathode load resistance of Vo1 is applied to the group selector through the rectifier Rcp and the wire C.

The impulse sent on the wire C also fires cold cathode tube Via, of which the cathode is at the potential of —150 v.; the relay Si is energised through the following circuit: cathode and anode of Via, relay Si, back contact ok6, earth. The tubes Voa . . . Voh do not fire at the instant under consideration, on account of the action exerted by the gates on the control electrode.

The relay Ot is energised through the following circuit: back contact or1, back contact cs5, front contact si4. Owing to the closing of contact ot1, the test relay T is connected to the wire A.

The impulse retransmitted by the register to the common control circuit is sent through the group selector by the following circuit; wire C, back contact HB2, make contact ga2. This impulse is received on a plurality of cold cathode tubes VRA1 . . . 6, VRB1 . . . 5, VRC1 . . . 4, placed in the common control circuit and arrives in the time unit following that in which the impulse from the wire F reaches the tube SVA3.

These 15 tubes are each controlled by a rectifier connected to one of the time-pulse sources, Ra, Rb, Rc, of which the impulse curve and the assignment have been shown in Fig. 6, said tubes only being able to be ionised at specific times. Thus, the tube CRA1 is controlled by the source of impulses Ra1, the tube VRA2, by the source Ra2 and so on, so that a tube such as VRA1 can only be ionised in one of the time units in which the source Ra1 is transmitting an impulse, i. e. according to Fig. 6, in time units 1, 7, 13, etc.

Similarly, the tubes VRB1 . . . 5 are each connected to one of the sources Rb1 . . . 5, through a rectifier, so that a tube such as VRB1, for example, can only be ionised during one of the groups of time units in which the source Rb1 is transmitting an impulse, viz. in time units 1 . . . 6, 31 . . . 36, 61 . . . 66, etc. The tubes VRC1 . . . 4 are also controlled by sources Rc1 . . . 4, of which the respective transmission time units may be found in Fig. 6.

Finally, there is a further last tube Vd which is not controlled by rectifiers, and thus can be ionised when it receives an impulse arriving from the register through the wire C in any time unit. The ionization of the tube Vd causes the voltage of its cathode to rise because of a 5,000 ohm resistance and the relay GF in the cathode circuit. The cathode of the tube Vd is connected to a point in the potentiometer which is connected to the grid of the tube SVA4 and normally biases this grid below the cut-off potential of the tube. Therefore, when the potential of this point is raised by the ionization of Vd, the tube SVA4 will conduct and raise the potential of the cathode of tube SVA3. This blocks tube SVA3 and prevents further pulses from passing to the register.

It is clear from the above that an impulse arriving in any time unit will always ionise one tube of each of the three groups VRA, VRB, VRC, in the same way as that of the tube Vd, so that a combination of tubes from each group is characteristic of each of the time units.

In the case, for example, of an impulse from outlet No. 25 in group No. 5, an impulse is produced in time unit No. 511 (i. e. in time unit $120 \times 4 + 31$) as has already been indicated, and is received on the cold cathode tubes of the common control circuit in the time unit No. 512.

This impulse is received at the moment when only the sources R$a$2, R$b$1 and R$c$2 are transmitting an impulse; the tubes VRA2, VRB1 and VRC2 are ionised, and operate relays A$b$, B$a$ and C$b$ inserted in the anode circuits.

Similarly, an impulse sent in time unit No. 89 which characterises the outlet No. 74 connected to group No. 1, is received on the cold cathode tubes in time unit No. 90, during which the sources R$a$6, R$b$5 and R$c$3 are transmitting an impulse; the tubes VRA6, VRB5 and VRC3 are ionised, and produce the operation of the anode relays A$f$, B$e$ and C$c$.

The make contacts of the three anode relays which are energised close circuits which characterise the outlet to which the group selector engaged for the call has to be connected.

The circuits of the group selector have been provided for use with a multi-switch having the following characteristics:

The switch comprises a certain number of horizontal bars, each of which may be considered as representing an individual switch capable of handling a call, like a single-motion switch of a well known type.

100 circuits have been provided accessible to all the individual switches and common to said switches.

When a vertical bar and a horizontal bar have operated successively, a certain number of contacts placed at the intersecting points on these bars are closed, the individual switch being connected through said contacts to the outlet in question. In the selector switch indicated in Fig. 3, these contacts are five in number, the five contacts placed at one of said points of interception being designated A, B, C, D and E. On the right hand side of these contacts, are shown the connections which terminate on the outlet which can be reached through the vertical bar concerned; on the left of these contacts are shown the connections associated with the individual switch. The 100 outlets are divided into two groups of fifty, fifty co-ordinate points being provided between each horizontal bar and the vertical bars and comprising two series each of five contacts. Each vertical bar is associated with an individual operating magnet, the energisation of said magnet causing the bar to be actuated upwards. A horizontal bar is provided for each of the $x$ individual switches, which make up the multi-switch; there is an individual horizontal magnet HM for each switch and two horizontal servo-magnets SHMA, SHMB common to all the switches. The operation of an individual horizontal magnet does not actuate the corresponding horizontal bar but the operation of a horizontal electromagnet operated by that of one of the horizontal servomagnets actuates the corresponding horizontal bar to the left or right, in order to close one or other of the series of contacts at the coordinate point determined by the vertical bar and the horizontal bar which have functioned.

It will be seen that the fifty time units taken in each of the two series of 60 (1–60—61–120) in a cycle of 120 time positions, are allocated to each of the two groups of fifty outlets of the switch. Each of the two groups of sixty time positions comprises 6×5×2 combinations of the P$a$×P$b$×P$c$ sources. If we refer to the common control circuit, it will be seen that the relays C$a$ . . . C$d$ corresponding to the four time positions of the cycle P$c$, characterise respectively the two groups of fifty outlets, 00 to 49 and 50 to 99, the relays C$a$, C$c$, and C$b$, C$d$ each respectively characterising the two groups of 25 series of contacts, 00 to 24, 50 to 74 and 25 to 49, 75 to 99 which are controlled by vertical electro-magnets 1 to 25 and 26 to 50. The first group of outlets 00 . . . 49 is connected by a selective operation by one of the horizontal servo-magnets SHMA; the second group of outlets 50–99 is connected by a selection operation by the other horizontal servo-magnet SHMB. The relays GD and GE are respectively actuated, when the relays C$a$, C$b$ and C$c$, C$d$ have operated, to control the operation of the switch. The table in Fig. 7 shows the numbers of the impulse sources P$a$, P$b$, P$c$ corresponding to the outlets. As has been indicated, the sources R$a$, R$b$, R$c$ are used in such a way with respect to the sources P$a$, P$b$ and P$c$, that the outlet marked by the number 25 on the said table, which is characterised by the impulse sources P$a$1, P$b$1 and P$c$2, will correspond (because of the one time delay) to the sources R$a$2, R$b$1 and R$c$2 in such a way that the register tubes VRA2, VRB1, VRC2, as also the corresponding relays A$b$, B$a$ and C$b$, will operate for the outlet 25.

In the first place, the circuit of one of the fifty vertical magnets VM of the multi-switch is completed; for the outlet No. 25, for example, this circuit is as follows: make contacts $cb$1, $ab$6, $ba$2, of the relays actuated by the tubes VRA2, VRB1 and VRC2, vertical magnet number 26; for the outlet number 74, for example, this circuit is as follows: make contacts $cc$1, $be$1, $af$5 of the relays respectively operated by the tubes VRA6, VRB5 and VRC3, vertical magnet No. 25.

Secondly, one of the relays GD or GE is energised, owing to the energisation of one of the relays C$a$ . . . C$d$ in series with one of the tubes VRC1 . . . 4. Thus, the relay GD is energised under the control of one of the relays C$a$ or C$b$ through the contacts $ca$2 or $cb$2; the relay GE is energised under the control of one of the relays C$c$ or C$d$ through the contacts $cc$2 or $cd$2. The vertical magnet which has operated completes the following holding circuit for itself; make contact $vm$1, associated with said magnet, make contact $gd$5, or $ge$5, relay GH, earth. The relay GH through its contact $gh$1 opens the circuit of the relay GB. At the same time, the vertical magnet VM which has been energised actuates the vertical bar associated with it upwards; the vertical bar number 26 is actuated in the case of a call intended for outlet No. 25; the vertical bar No. 25 is actuated in the case of a call intended for outlet No. 74. These two bars respectively control the contacts connected to the outlets 25 and 75 and to the outlets 24 and 74.

Each of the vertical bars closes two pairs of contacts, i. e. the contacts VB1 and VB3 associated with one of the two outlets which it controls (in the group 00–49) and two other contacts VB2 and VB4 associated with the second circuit.

One of the contacts closed in each pair is connected in series with the test circuit in which the winding of relay GC is included, so that this circuit is prepared by the closing of contact $gd$3 of relay GD through one of the contacts associated with the group of outlets 00 . . . 49; the closing of contact $ge$3 of relay GE prepares a test circuit through one of the contacts in the group 50 to 99. The result of this is, that the selected outlet can be tested through two possible circuits to the corresponding contact of the selected circuit only. Thus, in the case of a call to outlet No. 25, the test circuit passes through $gd$3 and the contact VB1 corresponding to outlet No. 25; in the case of a call to outlet No. 74, this circuit passes through $ge$3 and the contact VB2 corresponding to outlet No. 74.

Similarly, circuits are completed through contacts $gd$4 and $ge$4, through the contacts of each pair associated with the vertical bars, so that a second circuit peculiar to the selected circuit can be completed; the purpose of said circuit will be indicated further on.

As has been indicated, the register has caused the connection of the test relay T to the A-wire. The relay T is then energised through the following circuit: make contact $ot$1, A-wire, back contact HB4 in the group selector, make contact $ga$8, relay GC in the common control circuit, which is energised, make contact $gd$3 or $ge$3, one of the make contacts associated with vertical bars VB1, VB2, wire E of the selected circuit and the battery shown by the dotted rectangle in Fig. 3. The closing of contact $t$1 completes the double test circuit through the relays D$t$ and T in accordance with a well known method, and provided that the outlet concerned has only been selected by the call in question, the relay D*t* will also operate and lock to D*t*1. Contacts *ot*6 and *dt*3 (Fig. 1) are now both open which causes the release of all the group relays of outlets O*a* . . . O*h* which are in operation. The contact *dt*4 is closed, and operates relay C*s*. The closing of contact *cs*2 energises relay O*r*, provided that all the group relays of outlets have released their armature on account of the opening of contacts *ot*6, *dt*3. Contact *or*1 opens and releases relay O*t* which open *it* make contacts, the back contact *ot*5 again applies earth to the relays and the tubes O*a* . . . O*h*, V*oa* . . . V*oh* which characterise the outlets. The operation of relay GC in the common control circuit causes the closing of a holding circuit for that one of the relays GD or GE which is operated, so that this relay, like the actuated magnet VM, controlled by GD or GE, is no longer dependent upon the position of the anode relays C*a* . . . C*d*.

As has been stated, the return impulse from the register through the wire C causes the operation of the tube V*d*. The relay GF is energised in series with the tube V*d*. This relay short circuits the winding of relay GB which begins to fall back slowly. Before the relay GB is able to release fully, relay GC can operate; the contact *gc*3 opens the circuit of relay GB, which falls back immediately. Relay GB, in releasing, opens the contact *gb*1, which in turn opens the anode circuit of all the cold cathode tubes; those tubes which have been ionised are extinguished, thus causing the release of the corresponding anode relays.

The opening of contact *gb*3 does not put the tube SVA3 out of action, since the contact *gc*4 is closed. The deionisation of tube V*d* removes the positive bias on the grid of tube SVA4 and blocks this tube, thus lowering the potential on the cathode of tube SVA3, so that this tube can now deliver pulses again to the register.

After having determined the identity of the selected outlet, first of all a check must be made to determine the class of this outlet. To do this an impulse is sent to the register in one of the twenty time units shown in the second column of the table on Figure 5, this time unit being determined by the particular vertical bar of the switch which is operated. This impulse is produced in the following manner:

Each group of five individual lines F, where they come together, are connected through a rectifier DRCS and a resistance COR to a wire COL which is also connected through a resistance to an earthed battery. The junction of the rectifier DRCS and the resistance COR is connected to the source P*a*6 through a rectifier ERCP. When relay GC is operated, the source P*a*6 is also connected through a make contact *gc*1 and a rectifier to the potentiometer OPT connected to the grid circuit of tube SVA3. If earth is now applied to one of the wires COL, current can flow through the associated rectifier EPCP at all times except when this rectifier is blocked by the pulse from the source P*a*6. A positive pulse will therefore appear at the point of juncture of the associated five lines at one of the time units of P*a*6 determined by the particular P*b* pulse and P*c* pulse applied to rectifiers BRCP and CRCP of the particular branch of the gating circuit. Thus, if pulses P*b*1 and P*c*1 are connected to the particular branch circuit, the only P*a*6 pulse to appear on the grid of tube SVA3 will be in the No. 6 time unit. Pulses P*b*3 and P*c*1 will produce a pulse in the No. 18 time unit, while the pulses P*b*1 and P*c*2 will produce a pulse in the No. 36 time unit.

It is necessary then to earth a particular one of the twenty wires COL to produce a pulse identifying a desired class of service. For this purpose, the second contact VB3 or VB4 associated with each of the outlets accessible through the make contacts associated with the vertical bars is connected by an interchangeable connection to one of the 20 class-of-line wires COL, according to the class to which the outlet belongs.

It will be seen that all these time units, or time positions, correspond to the last position of each of the 20 successive groups of six time units P*a*, in a group of 120 time units defined by the sources P*a*, P*b* and P*c*. The first stage of gates controlling the 20 class-of-outlets wires COL is connected in every case to the source P*a*6. These time units are thus the 20 time units which are not associated with outlets 00 . . . 99, according to the table in Fig. 7. The second and third stages of gates are controlled by the sources P*b* and P*c*, and are the same as those controlling the scanning of the 100 test wires.

According to the class of outlet, an earth will be applied through the contact associated with the vertical bar corresponding to the selected circuit, to one of the 20 class-of-outlet wires; impulses are sent in the corresponding time units to the amplifier tube SVA3, which is maintained in working condition by the fact that the battery is maintained on the cathode through the make contact *gc*4, before the contact *gb*3 has been able to open, so that it may operate under the effect of the impulses received. These impulses are sent once in a cycle of 120 time units; this tube is triggered once during said cycle, on account of the detector impulse supplied by the source *d*2, which is connected to the grid of the tube SVA3 through a small condenser GC1. This happens at the exact moment when the impulse is sent by the source *d*2, which, as may be seen in Fig. 6, transmits exactly at the end of the time unit in which an impulse arrives from the wire COL.

This impulse is then regenerated in accordance with the method previously described for selective impulses.

The regenerated impulse is then transmitted to the register through the wire "D." In the register the operation of contact *or*2 has disconnected the grid of V*a*2 from the sources P*d*, in order to connect it to earth through a 50 k. resistance during the checking of the class of line. This renders the cathode of tube V*a*2 positive, so that from this moment onwards the rectifier R*c*2 is non-conductive, and unable to absorb the impulses from the source *d*3 which is connected to the grid circuit of the tube V*o*2. At the same moment, the tube V*a*3, due to the release of relay O*t* is connected to the impulse source P*a*1 through back contact *ot*4 and make contact *si*3. The sources P*a*2 . . . 6 are isolated on account of the opening of contact *si*5.

We will now explain the operation of tube V*a*3. It will be seen that during the selection period, the grid of this tube is connected to the impulse sources P*a*2 . . . P*a*6, through the back contact *ot*4 and the back contact *si*5, each of the sources being connected to a rectifier in order to avoid any interference between said sources. The result of this is that while these impulse sources are positive, the grid of V*a*3 is also positive; this tube, in becoming conductive, causes the application of a positive potential to its cathode; owing to this, the rectifier R*c*3, which is connected between the cathode of said tube and the 20 k. resistance connected to the source *d*3, is no longer conductive. Consequently, during the time units in which the selected impulse may arrive, the impulses from the source *d*3 cannot be absorbed by the rectifier R*c*3, the tube V*a*3 and the rectifier R*c*3 having no influence on the selective operations as described above. However, during the period corresponding to the emission of a positive potential by the isolated source P*a*1, the grid of tube V*a*3 becomes negative, its cathode is brought to a negative potential, and the rectifier R*c*3 becomes conductive. The result of this is that the impulses which may arrive on the wire D during selection, in the period corresponding to the emission of a positive potential by source P*a*1, may not be effective, because the impulses *d*3 arriving in the same time unit would be absorbed by rectifier R*c*3. The object of this arrangement is to prevent the register from responding incopportunely to the impulses arriving in the period corresponding to the impulses of the source P*a*1, during the selection period. These impulses immediately follow impulses from the source P$a$6, and because of the shift in time of the impulses delivered from the tube SVA3 in the control circuit of Fig. 4, are employed to give a register information as to the class of circuit selected, and a register must only respond to impulses in one of the time units corresponding to the transmissions P$a$1 when it is in a condition permitting it to receive this information.

We will now assume that the register is in a condition permitting it to receive information as to the class of outlet. The grid of the tube V$a$3 is connected to the source P$a$1 only, as has been indicated above, the rectifier R$c$3 then absorbing all the impulses applied from tube V$o$1 from the source $d$3 corresponding to the transmission of positive impulses by the sources P$a$2 . . . P$a$6. It will not absorb the impulses corresponding to the periods of transmission of a positive potential by the source P$a$1. Consequently, the register may respond now to impulses arriving in one of the time units exclusively corresponding to the impulses of the source P$a$1, and will not be influenced by any impulse which might arrive in any other time unit. The grid of tube V$a$4 is still connected to earth and the corresponding rectifier is not conductive.

When the impulse of the class chosen for the outlet is applied to the wire D, during a transmission period corresponding to the source P$a$1, the tubes V$a$1 and V$a$3 are simultaneously conductive and an impulse is sent to the tube V$o$2. The impulse generator constituted by the tube V$o$1 produces a regenerated impulse which begins at the moment when the source $d$3 is positive, and which is transmitted to the wire C. This impulse has no effect on the common control circuit since its contact $gb$1 is open, but it is applied to the tubes V$oa$ . . . V$oh$ of the register. There are two groups of these tubes which, together with individual relays operated thereby, act as indicators, four in the first group, of which V$oa$ and V$oc$ are shown and five in the second group, of which V$oe$ . . . V$oh$ are shown. All the tubes have their control electrodes connected through rectifiers to the pulse source R$a$1. The four tubes of the first group also have their control electrodes connected respectively to pulse sources R$c$1 . . . R$c$4 through individual rectifiers, while the five tubes of the second group have their control electrodes connected respectively to pulse sources R$b$1 . . . R$b$5 through individual rectifiers. According to its time position the impulse applied from tube V$o$1 will co-incide with the impulses R$b$, R$c$ and R$a$1 applied through rectifiers to the resistances associated with the control electrodes of a particular pair of tubes V$oa$ . . . V$oh$; in the case of a normal circuit to a second group selector, it is the tubes V$oa$, V$oe$ which operate, and control the energisation of relays O$a$, O$e$. In the case of an outlet to a final selector, it is the tubes V$oa$, V$oh$ and relays O$a$, O$h$ which operate.

The relays O$a$ . . . O$h$ may be used to control other circuits in any desired manner in accordance with the class-of-line information thus stored in the register.

The two examples quoted above have been arbitrarily chosen. If the outlet is a normal circuit to a second group selector its connection in the common control circuit to the class-of-line wires will be made to the wire appropriate thereto, which in the present example happens to be that one which corresponds to pulse sources P$b$2 and P$c$1. For an outlet to the final selector, the class-of-line wire is that whose pulse sources are P$b$3 and P$c$1. These two class-of-line indications would energize the tubes of the class of line recorder as indicated in the previous paragraph.

The relay O$k$ is energised through the following circuit: back contact O$t$5, make contact $dt$2, a make contact of one of the second group of relays, these contacts being arranged in parallel and $oe$4 alone being shown, a make contact of the first group of relays, these being also arranged in parallel and $oa$1 alone being shown, and earth.

This relay O$k$ can therefore operate via operating circuits coinsisting of contacts of the class-of-outlet relays other than those shown, but in the interest of simplicity, these contacts are not shown. For every class of outlet for which it is necessary to energize O$k$, an operating circuit including contacts of each of the two relays for that class of outlet would be provided.

Although there is provision for up to twenty classes of outlet, the tubes and relays for recording any one of six only appear in Figure 1. Although all of these six relays are shown, no contacts of the relays OC, OF and OG are shown. They would be used to control the operation of the register when the outlet is of any of the appropriate classes.

The operation of relays O$a$ and O$e$ causes in $oa$3 and $oe$3 the release of the relay O$r$, and the relay S$i$ falls back on account of the opening of contact $ok$6. The contacts of the other relays are also provided in the circuit of relay O$r$, although these contacts are not shown. The arrangement is such that one relay from each group will have to operate to release relay O$r$. Earth is eliminated on the wire B on account of the opening of contact $ok$5, so that the relay GA of the selector can be held through the magnet HM, contact $ga$4 and earth on the incoming wire E.

As soon as the magnet HM has operated, it opens its back contact $hm$2, thus eliminating the earth on the wire B of the selector. Relay C$h$ has remained momentarily operated, after the removal of earth on the wire B at $ok$5, through the earth from the selector via the following circuit: wire E, in the cord circuit through $ga$4, magnet HM of the selector and contact $hm$2, wire B1 but it now falls back, thus giving complete control of the operation of the selector magnet HM.

The earth applied through make contact $dt$4, make contact $cs$1, back contact $ch$1, make contact $ok$4, in the register and the wire D, now causes the operation of the horizontal servo-magnet SHMA or SHMB in the common circuit of the selector, said magnet having been connected to the wire D as a result of the operation of one of the relays GD or GE.

In the example of a call on the outlet No. 25, the relay GD is energised and magnet SHMA then pulls up; in the case of a call to outlet No. 74, relay GE is energised and magnet SHMB then pulls up. The result of this is that magnet SHMA, if pulled up, actuated to the left the horizontal bar of the individual selector in which horizontal magnet HM has previously been energised, as has been indicated in the patent application of A. J. Montchausse, Serial No. 146,211, filed February 25, 1950, for "Crossbar Commutating System and Method of Assembling the Same," on the other hand, if the magnet SHMB is pulled up, it actuates this bar to the right, so that in the first example the group selector is connected to outlet No. 25 and in the second example it is connected to outlet No. 74.

In the group selector the contacts HB1 . . . 4 associated with the horizontal bar, completely isolate the individual circuit of said selector from the corresponding common control circuit, and the test relays T, D$t$ of the register return to normal. The relay D$t$ causes the relay O$k$ at $dt$2 to fall back, and the relay C$s$ falls back owing to the opening of the contacts $ok$4 and $dt$4. The wire B is again earthed through back contact $ok$5 in order to energise relay GA in the selector circuit which has been seized, as will be explained later.

When the five contacts A . . . E connected to the desired circuit have been closed, the back contacts HB1, HB2, HB3 and HB4 are opened on account of the movement of the horizontal bars.

This puts the group selector in the desired condition for talking and disconnects it at the same time from the corresponding common control circuit.

The contact E of the switch is closed before the back contact HB4 associated with the horizontal bar is open. This connects ground on the wire E of the outlet through the make contact $ga$7 before the test circuit is opened, which holds the outlet busy by short circuiting the test potential applied to the wire E of the outlet. This short-circuit may also cause the release of relay GC of the common control circuit and the test relays of the register before the opening of contact HB4. The release of the test relays of the register connected to the wire A causes the register to suppress the earth which was previously applied to the wire D to operate electro-magnets SHMA or SHMB. However, it will be noted that the magnet SHMA or SHMB, when it operated the case may be, has closed a holding circuit for itself through: earth, make contact *shma*1 or *shmb*1 associated with the magnet SHMA or SHMB, make contact *gd*2 or *ge*2 according to whether relay GD or GE has been energised. Owing to this fact, the horizontal servo-magnet does not release immediately when the back contact HB3 is open in the group selector. However, as has previously been indicated, the relay GC is released in the common control circuit which causes relay GD or GE to fall back. The vertical magnet VM is released in turn, on account of the release of said relays GD or GE, which causes the return to normal of the vertical bar which has been energised, and that of the horizontal servo-magnet SHMA or SHMB which also releases on account of the relays GD or GE. Relay GH also releases with the release of GD. The relay GB of the common control circuit is now connected to the individual selector circuits through the back contacts *gc*3 and *gh*1; the common control circuit is completely released and ready to route a fresh call.

It will be noted that the release of the horizontal servo-magnet does not cause the return to normal of the horizontal bars of the selector, as these are held in the operative position by the horizontal magnet HM individual to the group selector.

In the present embodiment the selector comprises 100 outlets, 10 time units being allocated. To each of these 10 time units a potential impulse has been made to correspond, in order to characterise the group to which an outlet belongs. Three other potential impulses of different lengths characterise one outlet, and their coincidence supplies means for identifying this particular outlet. If we consider the 100 outlets, the coincidences of the impulses respectively allocated to them will appear successively in a cycle of 1,000 time units. Provision has been made for the impulse coincidences successively to actuate devices, which are normally gates, in the circuit connecting the selector with the register controller, so that a test circuit placed in said register can successively scan the electrical condition of all the outlets. The register controller hunts for an outlet belonging to a particular group. When the impulse marking the desired group has been received in the register, the identity of the chosen outlet, characterised by its time unit, is immediately signalled to the selector, and stored by a tube device placed in said selector. The outlet is then marked busy. As also indicated in the preceding description, the grid marking impulses are obtained from sources P*d*1 . . . P*d*10. The three other impulses characterising the number of the outlet on the banks of the multiswitch come from the sources P*a*1 . . . 5, P*b*1 . . . 5, P*c*1 . . . 4. The coincidence of a particular combination of the impulses P*a*, P*b*, P*c* actuates a device which is normally a gate placed between a particular outlet and the register controller, the outlet thus being identified.

Of course, the 100 outlets may be grouped in any desired manner. The 100 outlets may all be marked by impulses having a common time characteristic, so that they all belong to the same group; thus, they may all correspond to the same group of 100 time units characterised by the source P*d*1, or any one of the other sources P*d*1 . . . 10. In accordance with another method, two outlets may be allocated to the first group, three outlets may be allocated to the second group, the remaining outlets may be allocated to the third group: in this case the impulses characterising the two first outlets are sent through the first 100 time units of the cycle of 1000 time units, the impulses characterising the three next outlets are sent through the second period of 100 time units, the impulses characterising the 95 other outlets being sent during the third period of 100 time units. If in all there are 1000 time units and 100 outlets it is possible to provide up to 10 groups of outlets, but the selection of a group to which an outlet belongs is not limited in any other way. There may be any number of groups comprised between 1 and 10 and the number of outlets per group may vary to a great extent. It is thus possible to obtain a high degree of flexibility, as the outlets may be grouped or allocated to a particular number according to very varied arrangements. Thus, although it is necessary to have 1000 time units for 100 outlets, instead of 100 time units, in accordance with simpler methods of marking, the arrangement under consideration thus does not constitute a step backwards, but on the contrary, provides unexpected advantages from the standpoint of flexibility and renders it more easy to identify the outlets.

The fact has already been briefly emphasised that the distribution of 100 outlets into 10 groups has only been indicated as an example. It is not necessary to number the outlets on a decimal basis, and generally speaking, $n$ outlets may be considered individually or distributed in groups in any suitable manner.

In the example under consideration, 10 groups of 10 outlets have been provided, but one could equally well provide 5 groups of 20 outlets or 4 groups of 25 outlets. It is possible to choose a particular method of dividing the $n$ circuits in groups, for example, because it ensures better utilisation of the existing equipment. $m$ Test factors have been assigned to each of the $n$ outlets whatever the method of distribution of the outlets; as has been indicated said test factors are made up of cycles each comprising 10 time units, a source of potential impulses, such as P*d*1, corresponding to each of said units. If we apply to a certain number of outlets one of the $m$ test factors, respectively allocated to them, we thus form a definite group of outlets among the assembly of $n$ outlets of the selector. If we refer to the second example mentioned, in which three groups of outlets respectively comprise 2, 3 and 95 outlets, it will be seen that this result can be obtained by using $m=3$ test factors P*d*1, P*d*2, P*d*3 and by supplying P*d*1 to the two circuits of the first group, P*d*2 to the three circuits of the second group, and P*d*3 to the 95 circuits of the third group. However, as has previously been indicated it is possible to obtain up to 10 groups with $m=10$ and generally speaking there may be any number of groups between 1 and $m$.

If we compare the circuit of the selector and that of the register controller, as they have been described for a particular application, with the general case relating to $n$ outlets each having $m$ test factors, it is clear that 100 outlets and 10 test factors require 1000 time units, so that generally speaking there must be a cycle comprising $m \times n$ time units. For each of said time units, a circuit is established between the outlet of the selector and the test device of the register controller. It is possible to obtain $m$ groups of outlets in the general case while in the example described only 10 can be obtained. In order to enable the register controller to select an outlet belonging to a particular group its test device comprises an impulse source such as P*d*1, which sends impulses in time units which characterise the corresponding group. When an circuit is established between a selector and the test device, the outlet sends an impulse of the same phase and the test device operates. Said device is only influenced by an impulse of this kind, the impulses from the outlets belonging to other groups remaining ineffective.

It will be noted that there are $m$ groups of $n$ time units for $m$ possible groups of outlets. Each assembly comprises one time unit individual to each outlet and the $m$ time units allocated to an outlet are so arranged that there is one of these time units in a group of $n$ positions. The time units of each group must be characterised by a common test factor, two sets of time units never having the same test factor. Thus, in the example shown, the common test factors of the groups of 100 time units appear respectively, in different groups each comprising 120 time units in a total cycle of 1200 time units. Each outlet corresponds to 10 time units which are individually allocated to it, one in each of the 10 successive sets of 120 time units of the cycle and each outlet may be associated with one of the 10 time units individually allocated to it for the purpose of grouping.

It will be noted that the complete cycle comprises 1200 time units and that in each group of 120 time units there are 20 available. These additional time units are employed to transmit additional indications relating to the 100 outlets, said indications meeting the normal requirements of telephone exchanges. Arrangements have thus been provided so that at the time of sending these additional signals, the differences existing between 10 consecutive groups of 120 time units, which makes it possible to obtain a cycle of 1200 time units, is not utilised; on the other hand the cycle of 120 time units is employed. Of course, if a larger number of additional signals were desired, the cycle of time units used for this purpose can be raised, for example, to 240 time units by only using the sources P*d*1, P*d*2; to 600 units by only using sources P1 . . . 5, or at the maximum, to 1200 time units by using the sources P*d*1 . . . 10. In these various cases, the additional signals available will respectively be 40, 100 and 200 in number.

In the embodiment described where each group of time positions contains 120 time positions, these are each defined by a P*a* pulse, a P*b* pulse, and a P*c* pulse. Each of these time positions, together with a P*d* pulse form an individual test characteristic.

To a single group of 120 time positions (containing one for each outlet and twenty class-of-line positions) there is, therefore, a common test factor, formed by the appropriate P*d* pulse.

In the case of a telephone exchange, only 20 additional signals are used, said signals being used to indicate the classes of outlets, such, for example, as a line connecting second group selectors, a line connecting a group selector to the final selector. It will be seen that any additional signal must be able to be associated with several outlets or that said signals may be employed in common for all the outlets and that one or more outlets may be associated with any additional signal.

Arrangements have been provided so that two separate test operations are made successively by the register controller, the first among the time units special to the outlets, in order to select a free circuit in the desired group, and the second among the additional time units commonly allocated to the outlets.

It would be possible to have a common source of 1200 successive electrical impulses situated in time, but it is preferable to employ several cycles of impulses of different duration but having a predetermined relation between them, so as to produce locally the required test characteristics for each of the particular operations.

1200 test characteristics must be produced in the selector circuit itself, starting from a continuous electrical condition, one for each outlet or class of outlets. In order to do this, an electronic system is provided comprising an assembly of gates which produce cycles of 1200 or 120 time units as desired, in which 100, or up to 20 time units as the case may be, can be used for continuously applying electrical marking conditions to the test wires of the outlets or classes of outlets. It would be possible to ensure this operation by employing a stage comprising respectively 1200 or 120 gates, but this method is expensive. It is more economical to provide several stages of gates. The stages of gates are not necessarily arranged on a decimal basis, even in decimal selecting systems. Thus in the case of 100 electrical conditions, it is possible to employ three stages respectively, comprising 5, 5, 4 gates instead of 2 stages each comprising 10 gates. In fact, experience has shown that it is possible to save material by varying the arrangements of the gate stages.

In the example described, 3 or 4 different impulse cycles situated in time have been used in combination to obtain cycles of 120 or 1200 time units.

Whatever the number of time units per cycle in the cycles employed, the relation between the said cycles is always based on the principle of Fig. 6; in other words, a first cycle is provided comprising impulses of which the duration is taken as a time unit, a second cycle comprising impulses each having a duration equal to that of the first cycle, a third cycle comprising impulses, each having a duration equal to that of a second complete cycle and so on. In the example shown, there is no interval between the successive time units of any complete cycle. However in the case in which intervals have been arranged, the duration of an impulse of the second cycle added to the corresponding interval would be equal to the duration of the first complete cycle. In the example shown, the cycles P*a*, P*b*, P*c*, P*d* respectively comprise 6, 5, 4 and 10 impulses situated in time. There are thus 6 different series of impulses P*a* each comprising one impulse per cycle, said impulse being differently situated in time for each of the series. There are 5 different series of impulses P*b*.

Each of these different cycles of impulses P*a* appears once during the transmission of the different impulses P*b*, 5 times during the transmission of the different impulses P*c*, 20 times during the transmission of the different impulses P*d*, 200 times in the whole of the 10 cycles of impulses P*d*. Consequently, all the cycles of 6 impulses P*a* give $200\times6=1200$ impulses differently situated in time in a complete cycle P*d*, or $20\times6$ impulses differently situated in time in a complete cycle P*c*. Cycles of 5 individual impulses P*a* in a complete cycle P*d* are employed to characterise the units of the outlets, which gives $5\times200=1000$ individual time units out of a cycle of 1200 time units. A series of individual impulses P*a* in a complete cycle P*c* is provided to characterise classes of outlets, which gives $1\times20=20$ time units in a cycle of 120 time units. The various impulse cycles are employed to control several stages of gates arranged in the form of an inverted tree between the test wires of the outlets or classes of outlets and a common test device, which, in the example described, is a return signalling circuit going to the register. The successive gate stages are controlled by source P*d*, P*a*, P*b*, P*c* as shown in Fig. 8, each stage being controlled by sources of the same outlet.

With regard to the individual test characteristic indicating whether the line is free or busy, the presence of a test characteristic is used to indicate that the corresponding outlet is free, while its absence indicates that said outlet is busy. It is obvious that these two indications can be reversed.

It will be seen that the application of individual and common characteristics to the common test devices is made by static electrical devices comprising gates. No moving portion has been provided in the devices successively effecting the testing operations in the selector circuit.

What is claimed is:

1. Electrical testing equipment for electrically testing among a number of electrical outlets or circuits comprising means effectively for producing a number of recurring electrical pulses, spaced in time, and representing test characteristics, the number of said pulses being greater than the number of said circuits or outlets, a scanning device connected to all of said circuits or outlets, means effectively connecting said pulse producing means to said scanning device at separate times, so as to associate a plurality of test characteristics with each single circuit or outlet, and means for applying a plurality of separate tests to said scanning device for separately checking the identity of each of the plurality of test characteristics associated with said circuit or outlet.

2. Electrical testing equipment, according to claim 1, in which the means for producing pulses representing test characteristics greater in number than the number of said circuits or outlets is arranged so that the test characteristics are divided into a plurality of groups and the test characteristics associated with a circuit or outlet are each from a different group of said test characteristics.

3. Electrical testing equipment, according to claim 2, in which the means for connecting the pulse producing means to the scanning device connects a different one of a first group of pulses representing test characteristics to the scanning device, which group is at least equal in number to the number of said circuit or circuits, and any one of a second group of said pulses representing test characteristics to said scanning device, and further comprising means for causing any characteristic of said second group to represent any one or more of said circuits or outlets.

4. Electrical testing equipment, as claimed in claim 3, in which the pulse producing means produces a pulse time cycle comprising $n+o$ time units for $n$ circuits or outlets, $n$ pulse positions being individually associated with the circuits or outlets by the means for connecting the pulse producing means to the scanning device, and $o$ pulse positions being available for association with any one or more of said circuits or outlets by the means for causing the second group to represent any one or more of said circuits or outlets.

5. Electrical testing equipment, as claimed in claim 4, in which the means for producing the recurring pulses is arranged for producing a plurality of time pulse cycles of different orders in which the length of a pulse (including an interval between pulses, if any) in a cycle of a second order is equal to the length of a cycle of a first order, and so on, in which if the number of pulses per cycle of the first order is $x$, of the second order is $y$ and so on, the cycles taken in combination produce a consequent pulse cycle having a number of individually identifiable time units of the first order equal in number to $x \times y \times \ldots$, and in which the number of cycles of different orders and the respective numbers of time pulses per cycle for the different orders are such that $x \times y \times \ldots$ at least equals the total number of test characteristics required.

6. In an automatic telecommunication exchange, a cross-bar multi-switch selector circuit having a plurality of outlets, means for producing a plurality of recurrent pulses spaced in time and forming a plurality of test characteristics, a common test circuit, means connecting said common test circuit with all of said outlets, and means including said connecting means and connected to said pulse producing means for applying a different test characteristic for each different idle outlet of the multi-switch to said common test circuit.

7. A cross-bar multi-switch group selector circuit, as claimed in claim 6, having its outlets divided into numerical groups, further comprising means for causing said circuit to give access to an idle outlet in a wanted group, and means for allocating the test characteristic which identifies said outlet to a particular position in time to identify the numerical group to which said outlet belongs.

8. A cross-bar multi-switch selector circuit, as claimed in claim 7 in which the pulse-producing means produces electrical time-positioned pulses together defining a recurring cycle of time positions at least equal in number to the test characteristics required.

9. A cross-bar multi-switch selector circuit, as claimed in claim 8, in which the pulse producing means includes means for producing time pulse cycles of different orders in which the length of a pulse in a cycle of a second order is equal to the length of a cycle of a first order and so on, in which if the number of pulses per cycle of the first order is $x$, of the second order is $y$, and so on, the cycles taken in combination produce a coincident pulse cycle having a number of individually identifiable time units of the first order equal in number to $x \times y \times \ldots$, and in which the number of cycles of different order and the respective numbers of coincident time pulses per cycle for the different orders are such that $x \times y \times \ldots$ at least equals the total number of test characteristics required.

10. A cross-bar multi-switch selector circuit, as claimed in claim 9, in which the means connecting the common test circuit with the outlets comprises test leads individual to the selector outlets, means including a plurality of stages of electrical gates for connecting said leads in reverse tree formation to said common test circuit, and means for controlling each stage by pulse cycles of a single order, whereby electrical pulses equal in number to the outlets can be applied in successive time positions to the common test circuit to act as individual test characteristics for the outlets.

11. In an automatic telecommunication exchange, a cross-bar multi-switch selector circuit having a plurality of outlets, a common test circuit, means for producing a series of time-positioned pulses, static electrical means connected to said pulse producing means, to said outlets, and to said common test circuit, for applying in turn to said common test circuit a series of time-positioned pulses from said pulse producing means each characteristic of the identity of a corresponding outlet from the switch.

12. In an automatic telecommunication exchange, a cross-bar multi-switch selector circuit, as claimed in claim 11, in which the character of the pulse identifies the outlet and the presence of the pulse corresponding to an outlet signifies the free or busy condition of the outlet.

13. An automatic telecommunication exchange comprising a multi-switch selector having a plurality of outlets, a register controller including a common test equipment, a common circuit for said selector, means for producing electrical time-position pulses representing test characteristics, means in said common selector circuit and connected between said pulse producing means and said outlets for applying a number of pulses representing test characteristics, each individually characteristic of an outlet, to said common test equipment, means in said register controller for recording the group identity of a wanted outlet, means for controlling said common test equipment from said recording means, whereby a pulse representing a test characteristic having a particular factor determined by said register controller is detected, outlet-identity recording means, means for operating said outlet-identity recording means in accordance with the detected test characteristic pulse, and means for controlling the setting of an individual switch of the multi-switch under control of said outlet-identity recording means to prepare the connection to said outlet individual to said detected test characteristic.

14. An automatic telecommunication exchange, as claimed in claim 13, in which said pulse producing means also produces a plurality of additional pulses forming common test characteristics and said common multi-switch selector circuit comprises means for temporarily associating any one of said pulses representing common test characteristics with any one or more of a number of said outlets in addition to the pulses representing individual test characteristics of the outlets, means including the means for applying the pulses representing test characteristics to the common test equipment for applying the pulses representing common test characteristic of an outlet to said common test equipment after the outlet has been selected in accordance with its individual test characteristic, and means in the register controller and connected to said common test equipment for identifying and recording the pulse representing said common test characteristic transmitted thereto.

15. An automatic telecommunication exchange, as claimed in claim 14, further comprising means in the common multi-switch selector circuit, responsive to the outlet-identity recording means, for sending a signal back to the register controller, and means in said register controller responsive to said signal for modifying said register controller to receive and detect a pulse representing a common test characteristic.

16. An automatic telecommunication exchange, as claimed in claim 15, in which the common test equipment comprises static electrical detector means and means for setting said detector means to respond to pulses representing individual test characteristics of a wanted outlet.

17. An automatic telecommunication exchange, as claimed in claim 16, in which the means in the register controller for modifying said register controller comprises means for changing the setting of the static electric detector means to respond to pulses representing common test characteristics.

18. An automatic telecommunication exchange, as claimed in claim 17, in which the static electrical detector has two inputs and the means for setting said static electrical detector to respond to pulses representing individual test characteristics comprises means for applying pulses from the pulse producing means including pulses representing the desired individual characteristics to one of said inputs.

19. An automatic telecommunication exchange, as claimed in claim 18, further comprising means in the register controller for sending a further signal to the common multi-switch selector circuit in response to the receipt of a pulse representing a common test characteristic, and means in the selector circuit for responding to said further signal and in response thereto causing the individual switch of the multi-switch which has already been set to make connection with the selected outlet.

20. An automatic telecommunication exchange, as claimed in claim 13, in which the cross-bar multi-switch selector has a plurality of vertical magnets, each corresponding to an outlet of said selectors, and further comprising means in the common multi-switch selector circuit for operating a vertical magnet corresponding to a selected outlet in response to the operation of the outlet-identity recording means after a pulse representing an individual test characteristic has been detected, means in the register controller for sending a further signal to said selector circuit after receipt of a pulse representing a common test characteristic, and means in said common multi-switch selector circuit for responding to said further signal and in response thereto causing the already set individual switch of the multi-switch to make connection to the selected outlet.

21. An automatic telecommunication exchange, as claimed in claim 20, in which each individual switch of the multi-switch selector has a horizontal magnet and said multi-switch selector has a horizontal servo-magnet which when operated closes the connection to an outlet of said selector determined by the horizontal magnet and the vertical magnet which are operated, the means in said common multi-switch selector circuit responding to the further signal being adapted to operate the horizontal magnet of an individual switch of said multi-switch, and in which the means for sending a signal back to the register controller is operated by the individual horizontal magnet and the means in said common multi-switch selector circuit responsive to the further signal from said register controller for causing the connection to be made includes said horizontal servo-magnet.

22. An automatic telecommunication exchange, as claimed in claim 21, further comprising means controlled by the operation of the horizontal servo-magnet for disconnecting the common multi-switch selector circuit from the multi-switch selector.

23. Electrical testing equipment for electrically testing the condition of a plurality of outlets comprising a multi-switch having a plurality of outlets arranged in groups, a register adapted to be set to represent a particular group of said outlets, a common control circuit for said switch, means in said common control circuit for scanning all of the outlets of said switch and for producing a repetitive pulse in a predetermined cycle of pulses for each free outlet, the position of said pulse in time being characteristic of said outlet, means for transmitting said pulses to said register, means in said register responsive to the setting thereof for rejecting all pulses except a pulse characterizing an outlet in said particular group, means for retransmitting said pulse to said common control circuit, registering means in said common control circuit responsive to said retransmitted pulse for registering the identity of the outlet represented by said pulse, means responsive to said registering means for preparing said multi-switch for connection to the outlet identified by said registering means, means responsive to and controlled by said preparing means for transmitting a pulse to said register characteristic of the class of said particular outlet, means in said control circuit also responsive to said preparing means for transmitting a signal to said register, means in said register responsive to said last-mentioned signal and also responsive to said pulse transmitting means for altering said rejecting means to cause said rejecting means to reject all pulses but those characteristic of classes of outlets, means in said register responsive to the class-of-outlet pulse from said rejecting means for registering the class of outlet determined by said pulse, means in said register responsive to said class-of-outlet registering means for transmitting a signal to said common control circuit, and means in said common control circuit responsive to said last-mentioned signal for completing the connection of said multi-switch.

24. Electrical testing equipment for electrically testing the condition of a plurality of lines comprising a scanning device having a single outlet and branches connected thereto in tree formation terminating in a plurality of inlets, there being one for each line, means for connecting said inlets respectively to said lines, a plurality of pulse sources arranged in groups each pulse source producing a cycle of repetitive pulses, the pulses of each source of a group being spaced from the pulses of all the other sources of said group and the time duration of the pulses of one group being equal to each other and equal to a complete cycle of pulses of a preceding group, means including unidirectional current carrying devices for connecting certain of the group of pulse sources having the shortest pulse duration respectively to individual inlets connected to a single branch, means including unidirectional current carrying devices for connecting succeeding groups of pulse sources respectively to succeeding groups of branches, whereby each line may be represented by a pulse at said outlet identifying said line by the time position of said pulse, a circuit connected to said outlet, a multi-switch in said circuit for making connections to individual lines, means in said circuit responsive to a pulse received from said outlet for preparing said switch for connection to one of said lines, means responsive to said preparing means and including a unidirectional current carrying device for connecting another of the pulse sources having the shortest duration to said outlet, and means including a unidirectional current carrying device and controlled by said preparing means for connecting said same other pulse source to a selected one of said branches, whereby a pulse will appear at said outlet whose time position will be determined by said other pulse source and the particular branch of said scanning device to which said preparing means has connected said other pulse source.

References Cited in the file of this patent

UNITED STATES PATENTS

| | | |
|---|---|---|
| 2,310,452 | Meacham et al. | Feb. 9, 1943 |
| 2,447,495 | Den Hertog | Aug. 24, 1948 |
| 2,454,809 | Kruithof et al. | Nov. 30, 1948 |
| 2,490,048 | Gohorel | Dec. 6, 1949 |
| 2,541,932 | Melhose | Feb. 13, 1951 |
| 2,553,605 | Ransom | May 22, 1951 |
| 2,559,603 | Derjavitch | July 10, 1951 |
| 2,619,548 | Lesti | Nov. 25, 1952 |